United States Patent
Asakura et al.

(12)
(10) Patent No.: US 6,670,883 B1
(45) Date of Patent: Dec. 30, 2003

(54) REMOTE CONTROL SYSTEM FOR A VEHICLE DOOR

(75) Inventors: Suguru Asakura, Saitama (JP); Taizou Kikuchi, Saitama (JP); Akira Nagai, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 301 days.

(21) Appl. No.: 09/662,346

(22) Filed: Sep. 14, 2000

(30) Foreign Application Priority Data

Oct. 1, 1999 (JP) .......................................... 11-281953

(51) Int. Cl.⁷ ............................................. G05B 19/00
(52) U.S. Cl. .................... 340/5.61; 340/5.64; 340/5.72; 340/428; 340/7.32; 340/825.69; 340/825.72; 307/10.1; 307/10.4
(58) Field of Search ............................... 340/5.61, 5.64, 340/5.72, 428, 7.32, 825.69, 825.72, 5.62; 307/10.1, 10.4

(56) References Cited

U.S. PATENT DOCUMENTS 5,723,911 A * 3/1998 Glehr ........................ 340/10.5
5,844,517 A * 12/1998 Lambropoulos ............ 341/176

FOREIGN PATENT DOCUMENTS

| JP | 5-106376 | 4/1993 |
|---|---|---|
| JP | 09-032377 | 2/1997 |
| JP | 10-25939 | 1/1998 |
| JP | 10-153025 | 6/1998 |
| JP | 11-107592 | 4/1999 |
| JP | 11-117586 | 4/1999 |

* cited by examiner

Primary Examiner—Brian Zimmerman
Assistant Examiner—Yves Dalencourt
(74) Attorney, Agent, or Firm—Armstrong, Kratz, Quintos, Hanson & Brooks, LLP

(57) ABSTRACT

A remote door lock controlling apparatus for a vehicle performing a door lock control in response to a response signal received by a vehicle mounted receiver which is transmitted from a portable transmitter/receiver upon receiving a response demand signal from the vehicle is improved wherein the door lock control function is stopped by a request of the user or depending on the magnitude of a terminal voltage of a battery mounted in the vehicle.

11 Claims, 14 Drawing Sheets

REMOTE CONTROL SYSTEM FOR A VEHICLE DOOR

BACKGROUND OF THE INVENTION

1. Field of the Invention

The present invention relates to a remote control system for a vehicle door (s) which can automatically lock and unlock the door(s) of a vehicle in wireless communication and more particularly to a remote control system for a vehicle which can automatically lock the door(s) of a vehicle when a user (driver) who carries with him an electronic or entry key (with a portable transmitter/receiver) which includes an identification code assigned to the vehicle, walks away a first predetermined distance from the vehicle and automatically unlock the same when the user comes back to a second predetermined distance.

More particularly, the present invention relates to an improvement of the remote door lock controlling apparatus for a vehicle which is capable of inhibiting the automatically controlled locking and unlocking action of the door(s) of the vehicle either upon user's request or in response to decrease to lower than a predetermined level of a voltage of a vehicle mounted battery.

2. Description of the Related Art

Lock/unlock remote-control systems for vehicle doors are known having a so-called, "welcome function". In the systems, every user (driver) of a vehicle owns an entry key (with a portable transmitter/receiver) which upon receiving a response demand signal that is transmitted from a transmitter installed in the vehicle and is receivable within a predetermined range about the vehicle (which may be referred to as "having a predetermined communication area" hereinafter), can transmit a response signal carrying a unique identification code assigned in advance to each vehicle. When the user walks away from the predetermined range of the vehicle and its entry key is disabled to receive the response demand signal and thus to transmit back the response signal, the door of the vehicle is automatically locked. When the entry key moves into the predetermined range and its response demand signal is received by the transmitter/receiver which then responses thereto to send back a response signal, the door is automatically unlocked.

For example, some of such conventional "welcome function" based lock/unlock remote-control systems for vehicle doors are disclosed in Japanese Patent Laid-open Publications (Heisei)5-106376 and (Heisei)10-25939 in which a transmitter mounted on a vehicle is provided for intermittently transmitting a response demand signal having a predetermined communication area and, when receiving a signal responding to the response demand signal from an entry key which is carried by the user of a vehicle and moves into the predetermined communication area, examining whether the response signal is valid (regular) or not (welcome code examination). When the response signal has been examined to be valid, the door(s) of the vehicle is automatically unlocked. On the contrary, when the response signal is not valid or when the entry key stays out of the predetermined communication area and the vehicle-mounted transmitter receives no response signal, the door remains locked.

Accordingly, when the user of the vehicle carrying the entry key simply walks away from the predetermined range of the vehicle, the door of the vehicle can automatically be locked without paying any attention to or operating the entry key. When the user comes into the range, the door can automatically be unlocked. This requires no boresome actions of unlocking the door for riding the vehicle as well as contributes to the prevention of failing to lock door(s), and of vehicle theft.

The conventional systems have some advantages, particularly once the communication area is preset to a smaller size (for example, one meter in radius), the systematic locking of the door can easily be confirmed after getting off the vehicle, the power consumption for transmitting signals can be as small as not hostile to a battery, and the ID code (uniquely assigned to a vehicle) can hardly be intercepted by any other parties. The locking of the door may be easily confirmed by auditorily and visually perceiving the sound of a door locking mechanism and the shift of an inside door lock knob to the lock position.

Another conventional system disclosed in Japanese Patent Laid-open Publication (Heisei)10-153025 is provided in which a transmission antenna for detecting the approaching of an object into a middle-sized area around a vehicle is mounted on the vehicle in addition to an antenna for transmitting the response demand signal. Upon detecting the approaching of the object or a driver into the middle-sized area, the vehicle releases the response demand signal with a small-sized predetermined communication area and, when receiving a response signal to the response demand signal from the entry key of the right driver, unlock the door. Also, a second transmitting means having a greater communication area is provided for locking the door. The door is thus locked when the communication to the entry key with the second transmitting means is disabled.

In the conventional system, when the user who owns an entry key (for example, a driver who may be referred to as an "entry key" hereinafter) departs from the vehicle, the automatic lock/unlock system of doors is automatically turned on. Therefore, the response demand signal is continuously transmitted, even if the vehicle remains parked for a long period of time, or the voltage of the vehicle mounted batter is declined to a shortage level. This may result in disadvantages of no power in the battery during the parking period, disabling the user with the entry key to step in the vehicle and/or to start the engine of the vehicle. Particularly, after a long period of the parking, the risk of power shortage will be increased.

An apparatus disclosed in a drawing of Japanese Patent Laid-open Publication (Heisei)10-25939 permits an electronic (entry) key to be equipped with a manual switch but fails to describe any door lock/unlock action controlled manually with the electronic key.

SUMMARY OF THE INVENTION

It is an object of the present invention to provide a remote controlled door lock/unlock controlling apparatus which permits a user with an entry key, or a driver of a vehicle, to arbitrarily disable a door lock/unlock controlling action, known as a "welcome function", of automatically locking and unlocking a door(s) of the vehicle in response to the presence or absence of a response signal which is transmitted from the entry key in response to a response demand signal released from the vehicle, in order to minimize the consumption of power of a battery during the parking.

In the first aspect of the present invention, a remote door lock controlling apparatus for a vehicle comprises, a transmitter mounted on the vehicle for transmitting a response demand signal receivable within a predetermined range the outside of the vehicle, a receiver mounted on the vehicle for receiving a response signal from a portable transmitter/receiver which sends back the response signal in response to reception of the respond demand signal, a controlling means for controlling at least one of locking and unlocking of the door(s) of the vehicle in response to the reception of the response signal at the vehicle mounted receiver, the improvement comprising a function stopping means for stopping the transmission of the response demand signal.

Accordingly, the owner of the entry key can selectively and arbitrarily disable a welcome function for controlling the locking and unlocking of the vehicle door in response to the detection of the portable transmitter/receiver or the entry key either approaching from far to the vehicle or departing from the vehicle, that is, stopping of transmitting the response demand signal from the vehicle mounted transmitter for the welcome function. When the vehicle battery may be nearly exhausted after a long period of the parking and the welcome function may fail to perform automatically unlocking the door, or the operating torque of a starter motor may be declined to a too low level to start the engine, the welcome function can temporarily be stopped to save the battery.

In the second aspect of the present invention, a remote door lock controlling apparatus for a vehicle further comprises avoltage detecting means for detecting decrease of a voltage of a battery mounted on the vehicle to lower than a predetermined level and producing a voltage drop signal, and the function stopping means stops the transmission of the response demand signal in response to the voltage drop signal.

Accordingly, when such decrease of the battery power may provide a lower output voltage to disable the control operations of the vehicle (particularly, the start up of the engine), the welcome function can automatically be stopped to save the battery power and sustain the minimum level of the control operations for the vehicle.

In a third aspect of the present invention, a remote door lock controlling apparatus for a vehicle further comprises a function stoppage directing means mounted at least one of the vehicle or the portable transmitter/receiver for producing a function stoppage signal when operated, and the function stopping means stops the transmission of the response demand signal in response to the function stoppage signal.

Accordingly, when the function control code transmitting means for directing the stopping and resuming the control functions is equipped in the portable transmitter/receiver or the entry key, even if the welcome function fails to be turned off by the user at the disembarkation or is desired to be turned off since the period of parking is to be extended, it can automatically be stopped thus permitting the user to be free from returning back to the vehicle to stop the welcome function and contributing to the improvement of the utility.

In a fourth aspect of the present invention, when the vehicle mounted receiver receives a manual control signal transmitted from the portable transmitter/receiver for door lock control, the controlling means carries out at least one of locking and unlocking the vehicle door(s) corresponding to the manual control signal received even if the transmission of the response demand signal is stopped.

Accordingly, the owner of the entry key or the portable transmitter/receiver can arbitrarily perform the door lock control for the vehicle at any time.

DETAILED DESCRIPTION OF THE PREFERRED EMBODIMENTS

Figure 1:
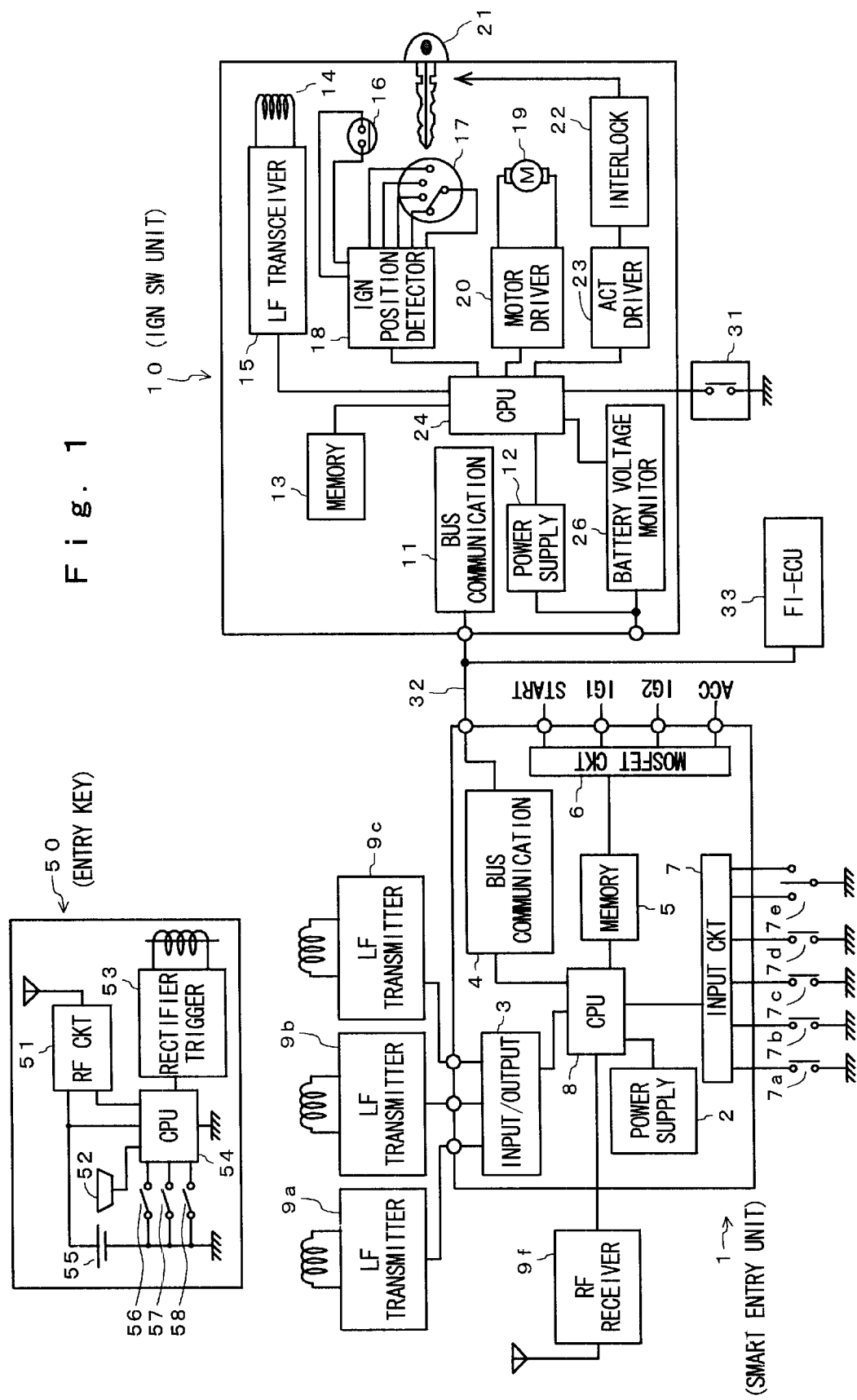
FIG. 1 is a block diagram showing a structure of the first embodiment of the present invention.

A remote control system for a vehicle door to which the present invention is suitably applied will be describe in more detail referring to the accompanying drawings.

Before starting the main description, some definitions on the flags at 1 of the bit and the timers employed in the description and the drawings are explained as listed below.

AREC=reception of A code;

ATM transmission of A response demand signal;

BCHG=start of examining the shift from small B response demand signal to large B response demand signal;

BLTM=transmission of large B response demand signal;

BREC=reception of B code;

BSTM transmission of small B response demand signal;

BSWEL=welcome function has been disabled due to battery voltage drop;

BTM=transmission of B response demand signal;

I(variable)=the number of consecutive receptions of A code;

IMCHK=start of immobilizing checkup;

IMDONE=finish of immobilizing checkup;

IMOK=result of immobilizing checkup is OK;

m(variable)=set value in timer T-OUT;

MOD(n,m)=remainder of n/m;

MU=process responding to manual code is being carried out with priority;

n(variable)=setting for the kind of response demand signals to be transmitted;

OUT=the entry key is out of communication area for A response demand signal;

RCHK=timer T-OUT has started for examining the entry key is not near about vehicle;

RF1/2=finish of refresh procedure 1, 2, respectively;

T-BCHG=timer for setting exchange of B response demand signals;

T-IMCHK=timer setting time for immobilizing checkup;

T-MU timer setting time for executing process responding to manual code with priority;

T-OUT=timer setting time for judging that the entry key is out of communication area for A response demand signal;

TSWEL=welcome function is disabled due to entry key switch operation

VCHK=start of checking battery voltage;

Timer Interrupt Permission Bit for Response Demand Signal=timer interruption permission for transmission of response demand signal.

A welcome system to which the present invention is applied will be described referring to the block diagram of FIG. 1.

A smart entry unit 1 comprises a power supply circuit 2 such as a battery equipped on the vehicle, an input/output circuit 3 connected to LF (low frequency) transmitter circuits 9a to 9c, a bus communication circuit 4 connected by a communication line 32 to an ignition SW unit 10 which will be described later, a memory circuit 5, an MOSFET circuit 6, an input circuit 7, and a CPU 8 connected to above-mentioned circuit components for controlling their actions. The CPU 8 is further connected to an RF receiver circuit 9f.

The input circuit 7 is also connected to a manual SW 7a for setting into a manual mode in which the transmission of the response demand signal from the vehicle mounted transmitter/receiver is stopped in response to on-operation of the switch SW 7a, and thus, the remote door lock controlling system is only responsible to manual codes transmitted by manual operation of the entry key 50, described later, and a door lock SW 7b for detecting the locking/unlocking of the door in addition to four door SWs 7c, a trunk SW 7d, and a door key cylinder SW 7e. The door SWs and trunk SW are to detect the states of opening and closing thereof. The door key cylinder SW 7e is to detect the movement of the door key cylinder to a locking position or an unlocking position.

The entry key 50 which is generally held and operated by the driver of the vehicle comprises substantially an RF circuit 51 for transmitting an RF signal from an antenna, an alarm display 52 such as a buzzer, a rectifying trigger (TRIG) circuit 53 for processing LF signals received from the LF transmitter/receiver circuits 9a to 9c, a CPU 54, and a battery cell 55. In addition, the entry key 50 according to the present invention includes manual lock/unlock switches 56 and 57 for transmitting manual codes to lock and unlock the door at manual remote control and a switch 58 for stopping the transmission of the response demand signal from the transmitter to set it into a manual mode or resuming the transmission of the response demand signal to return back to a normal mode. The switches 56 and 57 maybe modified into a single switch for repeating alternately the lock and unlock actions.

The ignition SW unit 10 comprises a bus communication circuit 11 for exchanging signals via the communication line 32 with the smart entry unit 1, a power supply circuit 12, a memory circuit 13, an immobilizing (anti-thief functioning) antenna 14, a low frequency (LF) transmitter/receiver circuit 15, a key SW 16 for detecting the insertion/extraction of a key, an ignition (IGN) SW 17, an IGN position detector 18 for detecting the contact position of the IGN SW 17, a motor 19 for actuating a rotary contact of the IGN SW 17, a motor driver 20 for driving the motor 19, an auxiliary (or emergency) key 21 which is inserted and extracted to and from the key cylinder, an interlock ACT (actuator) 22 for prohibiting the removal (or extraction) of the auxiliary key 21, an ACT driver 23 for driving the interlock ACT 22, and a CPU 24 for controlling the actions of the above-mentioned components The CPU 24 is also connected to a quick start SW 31 for starting the engine. Either one of the switch 58 and the manual switch SW 7a may be omitted.

Figure 2:
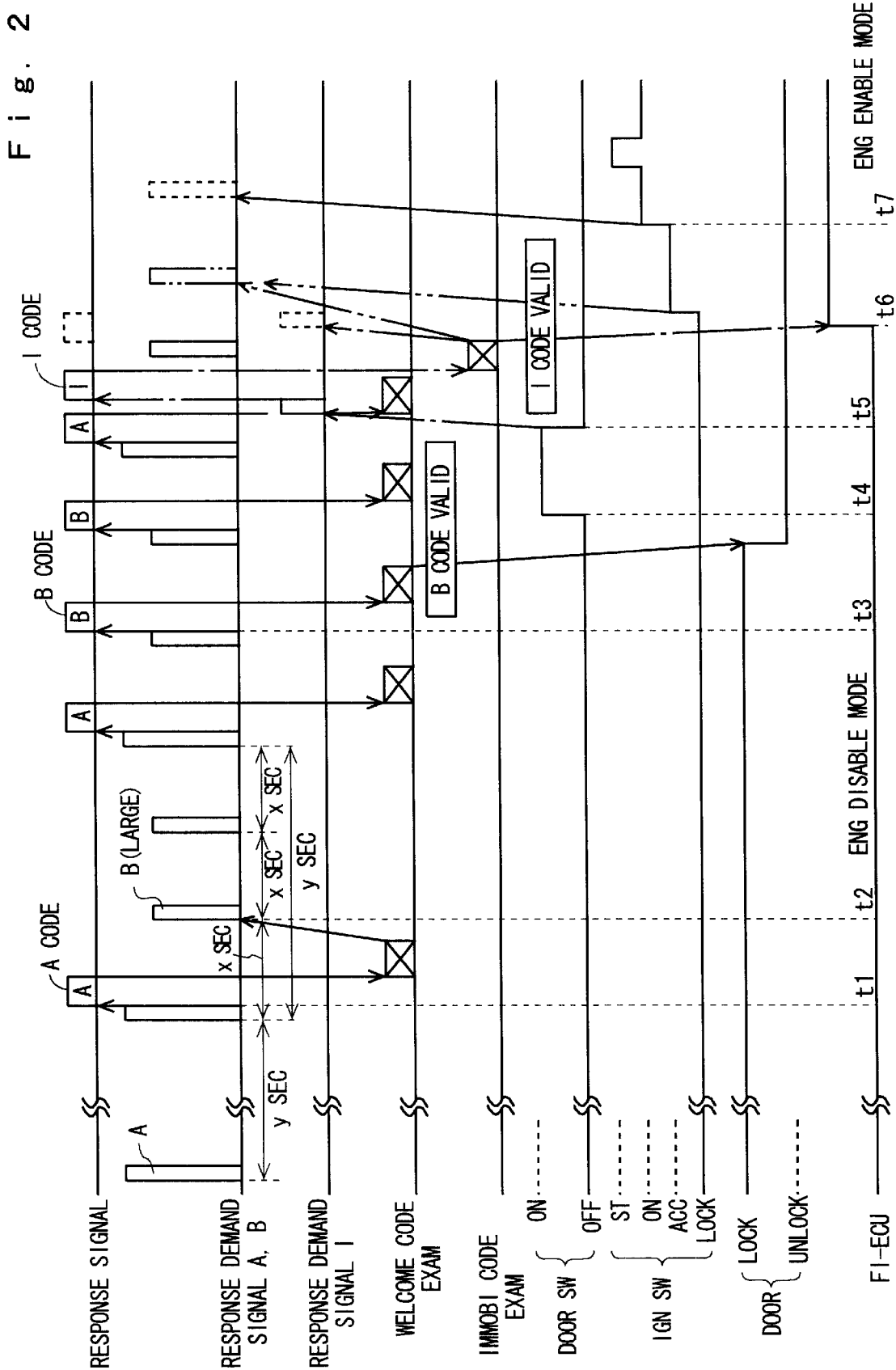
FIG. 2 is a timing chart illustrating the automatic unlocking action of a door in the first embodiment of the present invention when the driver carrying the entry key moves to the vehicle and embarks.
Figure 3:
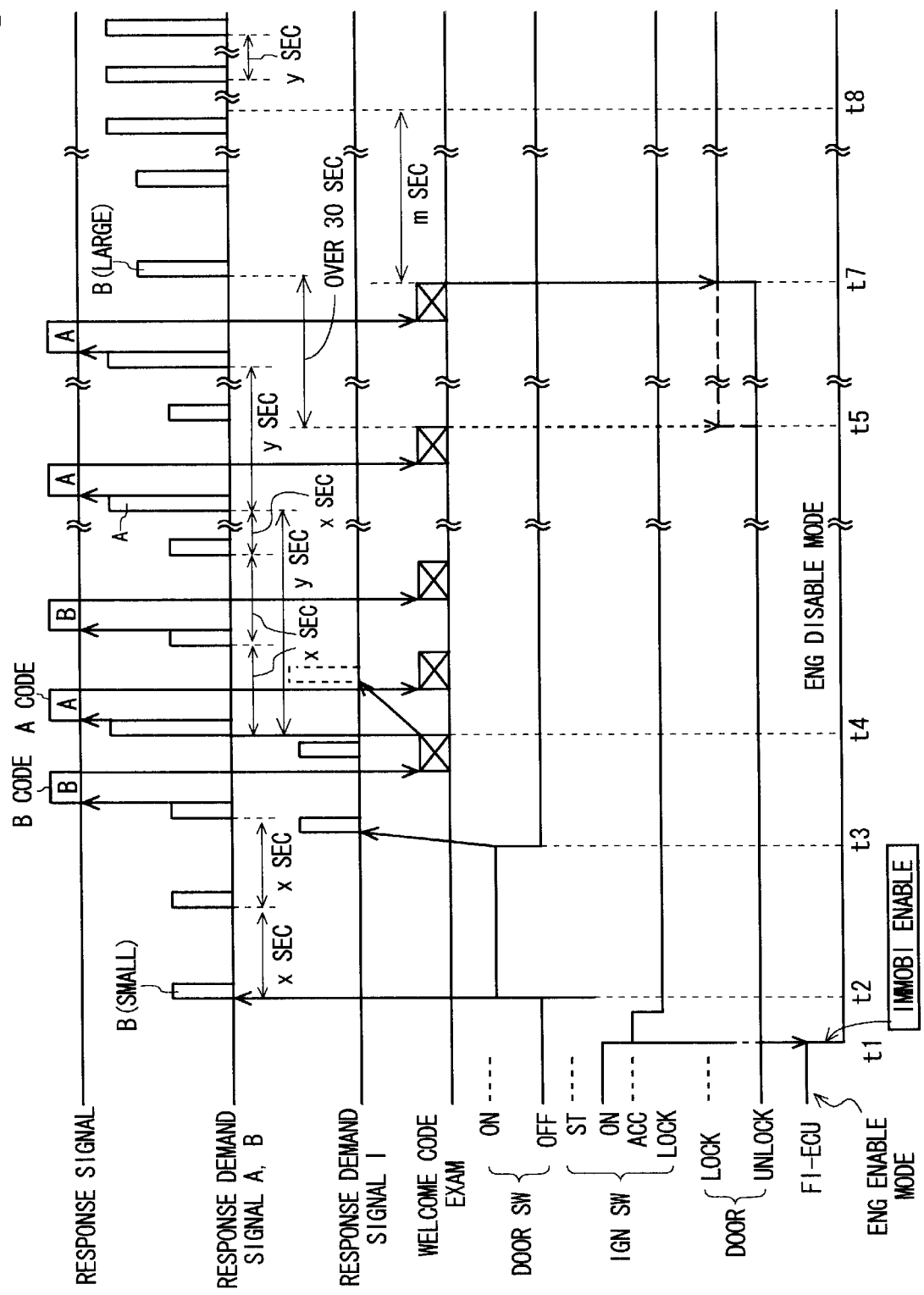
FIG. 3 is a timing chart illustrating the automatic locking action of the door in the first embodiment of the present invention when the driver disembarks and the entry key departs from the vehicle.
Figure 13:
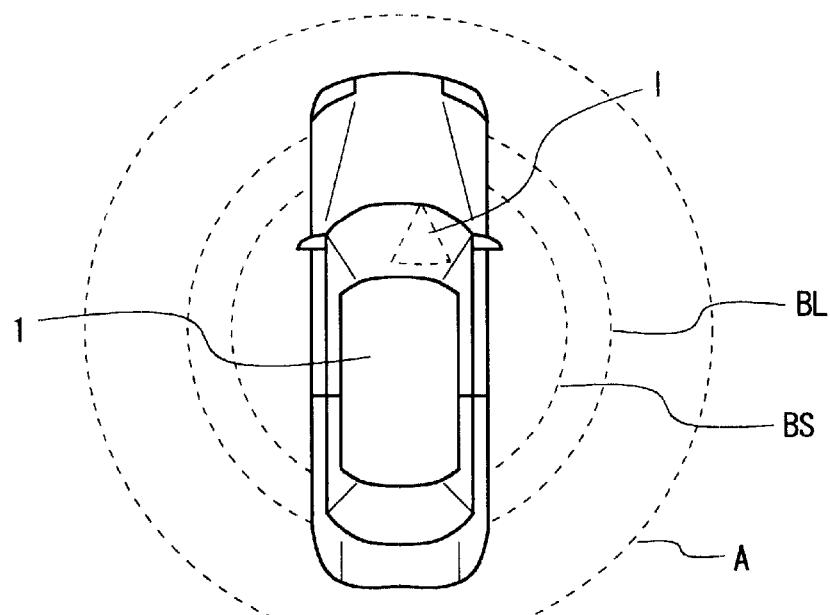
FIG. 13 is a schematic view showing the relation between the control operations and the distance from the vehicle to the entry key in the first embodiment of the present invention.

The operation of the smart entry unit 1 and the entry key 50 will schematically be described referring to the timing charts of FIGS. 2 and 3 and the schematic view of FIG. 13. FIGS. 2 and 3 illustrate the welcome function in which the door of the vehicle is unlocked and locked in response to the detection of the user carrying the entry key 50 (who may hence be simply referred to "entry key" hereinafter) coming close to the vehicle 1 for boarding and leaving from the vehicle 1 after getting off, respectively. In these figures, the height of the bars of the response demand signals represents the intensity of the signals thus indicating the size of the communication area (receivable range).

When the entry key is outside of and distanced significantly from the vehicle of which the door remains locked in a disembark or parking mode, an A response demand signal (of e.g. 100 kHz) shown at the left side end in FIG. 2 is transmitted from the vehicle at equal intervals of a first predetermined time (y seconds) and with an intensity corresponding to the maximum communication area (for example, 4 to 5 meters in radius) denoted by A in FIG. 13. As the driver carrying the entry key moves into the communication area A for the A response demand signal, the entry key receives the A response demand signal at the moment t1 and transmits a send-back signal or a response signal responding to the A response demand signal which includes an A code and may be referred to as "A code" hereinafter. The format of the response signal will be explained later in more detail referring to FIG. 15.

The vehicle, when receiving the response signal and judging that the response signal received is valid, releases a large-area B response demand signal (e.g. of 300 kHz and having a one-meter-radius communication area denoted by B (large) in FIG. 13) from t2 at equal intervals of a second predetermined time (x seconds). It is assumed y>x or more specifically, y=3x in this embodiment. Upon receiving the BL response demand signal at t3, the entry key 50 releases a response signal which includes a B code and may be referred to as a "B code" hereinafter. When it is judged that the response signal including the B code is valid, the door of the vehicle is unlocked.

As the door is opened at t4 (door SW is on) and then closed at t5, it is determined that the driver has embarked and an I (immobilizing) response demand signal designated its communication area as in the interior of the vehicle is transmitted. When the entry key then releases a response signal to the I response demand signal, which include an I code (immobilizing code), the vehicle carries out immobilizing checkup (immobilizing code examination) for deciding whether the I code received is valid or not. When the I code is valid, the transmission of the I response demand signal is stopped and an FI-ECU 33 is switched at t6 into the engine enabling mode.

Then, upon the ignition SW (IGN SW) being turned to the ON position at t7, the transmission of both the A and B response demand signals is stopped and simultaneously are fresh 2 process is commenced as will be described later. The transmission of the A and B response demand signals may be stopped, instead, upon judging that the I code is valid, or in response to the on/off reversal of the door switch triggered by the opening and then closing of the door (cf. differently dashed lines in FIG. 2).

The movement of the vehicle 1 is stopped and then as the IGN SW is turned from the ON position to the ACC position at t1 as shown in the left end of FIG. 3, the FI-ECU 33 is switched to the engine disabling mode. When the door SW is shifted from the OFF position (door closed) to the ON position (door opening) at t2 in the door unlock mode, it is judged that the driver is about to disembark and the transmission of a BS response demand signal (e.g. of 300 kHz having substantially a 0.5-meter-radius communication area denoted by BS in FIG. 13) is then commenced. This is followed by intermittently transmitting the BS response demand signal at equal intervals of the second predetermined time (x seconds) from the vehicle. Then, as the door SW is shifted from the ON position to the OFF position (door closed) at t3, the I response demand signal is transmitted at the predetermined intervals.

The BS response demand signal and the BL response demand signal are both to demand the entry key transmit a response signal containing the B code. The two response demand signals are different only in the communication area (a range for transmitting and receiving signals) and identical to each other in the other properties.

When the entry key is disembarked, it enables to receive not the I response demand signal but the BS response demand signal. Then a response signal to the BS response demand signal including the B code is released. When the response signal including the B code is receive and is judged to be valid at t4, the A response demand signal is commenced to be transmitted while the transmission of the I response demand signal is stopped. The entry key continues to release the response signal including the A and B codes while receiving both the A and BS response demand signals.

As the driver with the entry key moves away from the vehicle and steps out from the BS communication area shown in FIG. 13, it is disabled to receive the BS response demand signal and no response signal with B code shall be sent back. When the B code is not received by the vehicle after a predetermined period (for example, 30 seconds as shown in FIG. 3) from the reception of the A code (at t5 in FIG. 3), the B response demand signal is switched from the BS signal to the BL signal. As the B code is no more received after the predetermined period while only the A code is received and its welcome code examination is executed (i.e. in this embodiment, only the A code is continuously received but the B code has not been received in y seconds), the door is then locked at t7 when the final A code is examined to be valid.

After t8 when the setting (m seconds) of the T-OUT timer has elapsed since the entry key is far enough away from the vehicle not to receive the A response demand signal and thus not to send back the A code, the intermittent transmission of only the A response demand signal at the intervals of y seconds is maintained. Alternatively, as denoted by the dotted line in FIG. 3, the door maybe locked at t5 when the A code is received just after the reception of the B code at the estimated (expected) moment is not executed.

The operation of the smart entry unit 1 will now be described schematically referring to the flowcharts of FIGS. 4 through 6.

Upon energized, the system is initialized in its entirety (Step S1). At Step S2, it is examined whether the ignition switch (referred to an IGN SW hereinafter) is turned on or not. When the IGN SW is turned off by the driver to stop the vehicle at t1 in FIG. 3, the procedure goes to Step S3 where the refresh 1 process, i.e. the initialization of flags for the (anti-thief) immobilizing system, is carried out. This process at Step S3 will be explained later in more detail referring to FIG. 7.

This is followed by Step S5 where it is examined whether the door is unlocked or not. At Step S6, it is examined whether or not the door SW is turned from the ON position to the OFF position (i.e. whether the opened door of the vehicle is closed or not). As it is judged "NO" at Step S6 while the door is opened for disembarkation, the procedure jumps to Step S9 where it is examined whether or not the manual SW 7a is turned on for shifting the system to the manual mode where the door can be unlocked and locked using the manual switch. In normal, the manual SW 7a remains turned off (i.e. the manual mode is not selected) and it is judged "NO".

It is then examined at Steps S9A and S9B whether or not the welcome function is disabled (i.e. no transmission of the response demand signal is made) in response to the switching on of the manual switch 58 on the entry key or the dropping of the battery voltage to lower than a predetermined level. In normal operation, it is judged negatively at each the step. It is then examined at Step S10 whether or not the door SW is turned from the OFF position to the ON position (i.e. the closed door is opened).

As the door is opened for disembarkation, the door switch is turned from the OFF position to the ON position and it is judged "YES" at Step S10. Then, Step S10 follows where it is examined whether the BREC flag is 1 or not (i.e. the B code is received or not). In the beginning, the B code is not received and the procedure advances to Step S12 where the BSTM flag is set to 1 and the variable n for determining the type of the response demand signal (A, BS, or BL) is reset to 0.

Step S12 is a process of selecting the type of the response demand signal to be transmitted and, as will be explained later, the B small type having a smaller communication area is set. At Step S13, the timer interruption permitting bit for enabling the transmission of the response demand signal is set, i.e. the transmission of the response demand signal by timer interruption is enabled.

Then at Step S14 (FIG. 6), the code signal contained in the response signal transmitted from the entry key 50 and received by the vehicle is compared with ID codes previously stored in the memory circuit 5 in the vehicle. When it is judged positively, Step S15 follows where it is examined what its function code is (which will be explained later referring to FIGS. 15 and 16). More specifically, it is examined which is received, the response signal (including either A code or B code) from the entry key 50, the manual code corresponding to the operation of the manual switches 56 and 57, or the function control code corresponding to the operation of the switch 58.

At the beginning, it is judged negatively at Step S14, the procedure goes to Step S15A where it is examined whether the immobilizing checkup has been carried out with reference to the IMCHK flag. At the time, the immobilizing checkup is not yet performed and the procedure jumps to Step S30 (FIG. 5). As it is judged negatively at Step S30, the procedure further advances to Steps S30B and S30A. At these three steps, it is judged whether or not the welcome function is disabled by the same reason as in said Steps S9, S9A, and S9B. In the normal operation, as the judgments in Steps S30, S30B and S30A are all negative, the procedure moves to a block S41.

At Block S41, the flags for the welcome function are initialized when the code is not received during a predetermined period of time. In fact, it is examined referring to the OUT flag at Step S31 whether or not the entry key is out of the communication area for the A response demand signal. In the beginning, it is not registered (i.e. OUT flag=0) that the entry key is out of the communication area for the A response demand signal. It is then examined at Step S32 whether the RCHK flag is 1 or not (i.e. the T-OUT timer for setting time duration to determine that the entry key is not adjacent to the vehicle, has been started or not). When it is judged "NO", the procedure goes to Step S33 where the T-OUT timer is set to m seconds.

It is preferable that m satisfies m sec>y(=3x) sec≧z sec where y is the interval of transmission (or cycle) of the A response demand signal, x is the interval of transmission of the B response demand signal, and z is the interval of transmission of the I (immobilizing) response demand signal, as shown in FIG. 2. Then, at Step S34, the RCHK flag is set to 1 for starting the T-OUT timer.

This is followed by Step S35 where it is examined whether the T-OUT timer is turned to zero as the setting time of m seconds has been elapsed. In the beginning, the setting time of m seconds is not elapsed and thus the procedure returns back to Step S2.

As the driver disembarks and the door is closed, the door switch is shifted from the ON position to the OFF position allowing Step S6 to judge "YES". The procedure thus goes to Step S7 where the refresh 1 flag is reset to 0. Step S8 follows where the timer interruption permitting bit for permitting the transmission of the I response demand signal is initiated to enable the transmission of the I response demand signal with timer interruption. Then, the procedure moves to Steps S14, S15A, and S30, and Block S41 and returns back to Step S2.

As the entry key 50 is moved out of the vehicle, it receives the BS response demand signal and sends back the B code. The B code from the entry key 50 is received by the receiver on the vehicle and qualified as a valid code and it is then judged "YES" at Step S14. The procedure thus goes to Step S15 where it is examined whether or not the signal code received is the manual code sent from the entry key 50 by the manual switch operation for locking and unlocking the door. When it is judged "YES", the procedure advances to Step S16 where the manual operation is enabled (which will be explained in more detail referring to FIGS. 21A and 21B).

Since the received code is the B code transmitted in response to the response demand signal at present, it is thus judged negatively at Step S15 and the procedure goes to Step S15F where it is examined whether or not the received code is a function control code due to the operation of the manual switch 58. When it is judged "yes", the procedure goes to Step S15D where a function control is carried out as will be described later in more detail referring to FIG. 20 and then returns back to Step S2. Returning to Step S15F, since it is now judged negatively, the procedure goes to Steps S15B and S15C for performing the same examinations as those of Steps S9A and S9B.

When at least one of Steps S15B and S15C is positive, the procedure goes back to Step S2. Since these two steps are now negative, the procedure advances to Step S17 where it is examined whether the manual SW is turn on or not. When it is judged "YES" at Step S17, the procedure returns back to Step S2. As "NO" is now given at Step S17, however, the procedure goes to Step S18 where the welcome function process for unlocking/locking the door in response to the result of the welcome code judgment is executed. Welcome Function Process at Disembarkation The welcome process at Step S18 in FIG. 6 will now be explained in more detail referring to FIGS. 9 and 10. It is assumed that the driver stops the engine, disembarks, and departs with the entry key from the vehicle. As described previously, the disembarkation of the driver is followed by Step S12 (FIG. 4) for selecting the transmission of the BS response demand signal and resetting the variable n to 0 and Step S13 for enabling the transmission of the B response demand signal with timer interruption. Then, the welcome process is commenced at Step S18 in response to the reception of the correct B code.

The welcome process starts with Step S171 where it is examined whether the signal code received from the entry key is the A code or not. In the beginning, since the A response demand signal is not transmitted it is judged "NO", allowing the procedure to goes to Step S201. When it is judged at Step S201 that the received code coincides with the right B code, the procedure moves to Step S202 where the BREC flag representing the reception of the B code is set to 1 while the number of consecutive receptions of the A code denoted by I is set to zero.

At Step S203, it is examined whether the MU flag is 1 or not, which indicates that a manual code prior process having a priority to respond to the manual code received from the entry key 50 is being executed.

When it is judged positively at Step S203, the procedure moves to Step S213 where it is examined whether the T-MU timer for determining a duration of the manual code prior process is timed up or not. When the decision is positive, the procedure goes to Step S204 where the door is unlocked and Step S205 follows where the MU flag is shifted back to 0. If the decision is negative at Step S203 and the duration of the manual code prior process is not timed up, the procedure skips Steps S204 and S205 and jumps to Step S209. When Step S203 is negative, the procedure moves to Step S204 where the door is unlocked.

It is then examined at Step S209 whether the AREC flag is 1 or not. As the A code is not received by now, it is judged "NO". The procedure hence goes to Step S210 where the ATM flag is set to 1 for enabling the intermittent transmission of the A response demand signal. At Step S211, the variable n is set to 0. At Step S212, the timer interruption permitting bit for the I response demand signal is cleared off to inhibit the transmission of the I response demand signal. At Step S214, the BCHG flag is set to 0 for inhibiting the switching over from BS demand signal to BL demand signal. While the B code only is received continuously, the above steps are repeated.

When the A code is released from the entry key in response to the reception of the A response demand signal and received by the vehicle, it is judged "YES" at Step S171. The procedure then goes to Step S172 where the AREC flag is set to 1 while the OUT flag and the RCHK flag are turned to 0 to register that the entry key 50 is within the communication area for the A response demand signal and reset the T-OUT timer. At next Step S173, the variable I indicating the number of consecutive reception of the A code is increased by 1 for updating (I is thus turned to 1). It is then examined at Step S174 whether or not the variable I is turned to 2 (for example). In the beginning, I is not 2 and the procedure jumps to Step S180.

It is examined at Step S180 whether the BSTM flag indicating the selection of the BS response demand signal is 1 or not. As the BSTM flag is 1 so far, it is judged "YES" and the procedure moves to Step S181 where it is examined whether the BCHG flag for causing the B response demand signal being switched from BS to BL is 1 or not. As the BCHG flag is now 0, the procedure goes to Step S182 for setting the BCHG timer to, for example, 30 seconds.

The setting time for the BCHG timer may be determined on the basis of experiments or actual measurements to a duration enough to allow the entry key to get away enough from the vehicle and step out of the communication area for the BL response demand signal. Then, the procedure moves to Step S184 where the BCHG flag is shifted to 1. It is then examined at Step S185 whether the BCHG timer is turned to zero or not. In the beginning, the timer is not zero and the procedure returns back to Step S2.

When the A code is next received from the entry key, the procedure jumps from S174 to S180 and then from S181 to S185. As it is judged "NO" at Step S185 before the setting time (for example, 30 seconds) of the BCHG timer elapses, the procedure returns back to Step S2. When the setting time has elapsed, however, it is judged "YES" at Step S185.

As a result, the procedure advances to Step S186 where the BSTM flag for selecting the BS response demand signal is turned to 0. At Step S187, the BLTM flag for selecting the BL response demand signal is turned to 1. Accordingly, the transmission of the BL response demand signal is initiated by timer interruption. As the entry key is far enough away the vehicle and out of the communication area of the BL demand signal at the time, it is disabled to receive the BL response demand signal and sends back none of the B code.

As the entry key steps out from the communication area (FIG. 13) of the BL response demand signal, the B code is not received but the A code only can be continuously received by the vehicle side. With the welcome function, the decision only at Step S171 is continuously positive. This causes the variable I to be updated to 2 at Step S173 thus turning Step S174 to the positive decision. Then, it is examined at Step S175 whether the MU flag is 1 or not.

When the decision is positive, the procedure goes to Step S179 where it is examined, like the action of Step S213, whether or not the T-MU timer is timed up, i.e. the duration of the process for responding with priority to the manual code received from the entry key is consumed. When the decision is positive, the procedure goes to Step S176 where the door is locked. Then, after the MU flag is turned to 0 at Step S177, the procedure goes to Step S180. If the decision at Step S175 is negative, the procedure also moves to Step S176 where the door is locked. When the judgment at Step S179 is negative, the procedure skips Steps S176 and S177 and jumps to Step S180.

As the entry key departs further from the vehicle, it is disabled to receive finally the A response demand signal and thus to release the A code. This causes Step S14 of the procedure to judge "NO" and the procedure moves via Step S15A shown in FIG. 4 to Step S30 shown in FIG. 5. Then, Block S41 follows in which the flags are examined at Steps S31 and S32 before the T-OUT timer is set to m seconds at Step S33, as described previously. As long as it is judged "NO" at Step S35, the procedure always restarts from Step S2.

Figure 5:
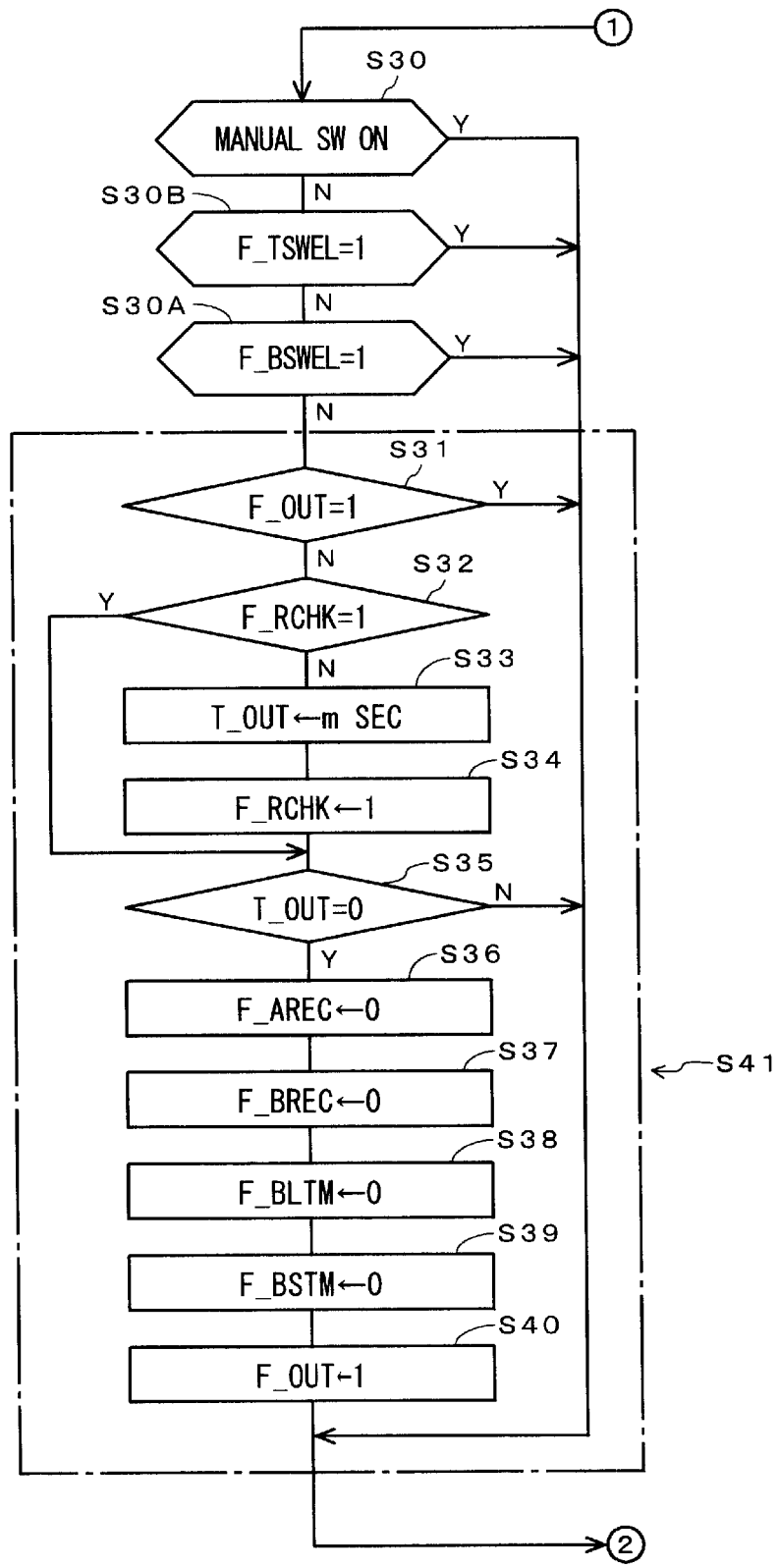
FIG. 5 is another part of the main flowchart showing the action of the first embodiment of the present invention.

When the A code is no more sent back and it is thus judged "YES" at Step S35 after m seconds of the setting time on the T-OUT timer, i.e. any sent-back code from the entry key 50 is not received in a duration of m seconds, as illustrated in the flowchart of FIG. 5, the procedure moves to Steps S36 to S39 for initializing the AREC, BREC, BLTM, and BSTM flags to 0 which flags relate to the welcome process. The procedure then goes to Step S40 where the OUT flag is turned to 1 to register that the entry key 50 is out of the communication area for the A response demand signal. This is followed by the procedure returning back to Step S2 for repeating the steps.

As the BLTM and BSTM flags are set to 0 at the time, the procedure corresponds to the state after t8 in FIG. 3 and before t1 in FIG. 2 where the intermittent transmission of only the A response demand signal is executed. As apparent, the A response demand signal is not received by the entry key and its response signal carrying the A code is not sent back.

Welcome Function Process at Embarkation

A case of the driver with the entry key 50 approaching and embarking the vehicle will now be explained. As the entry key moves from a far enough point where the A response demand signal cannot be received to a near point within the communication area for the A response demand signal, it receives the A response demand signal and sends back the A code in response. When a correct ID code is received by the vehicle, it is judged "YES" at Step S14 and the procedure goes to Step S15 for judgment whether the received code is the manual code or not.

Figure 17:
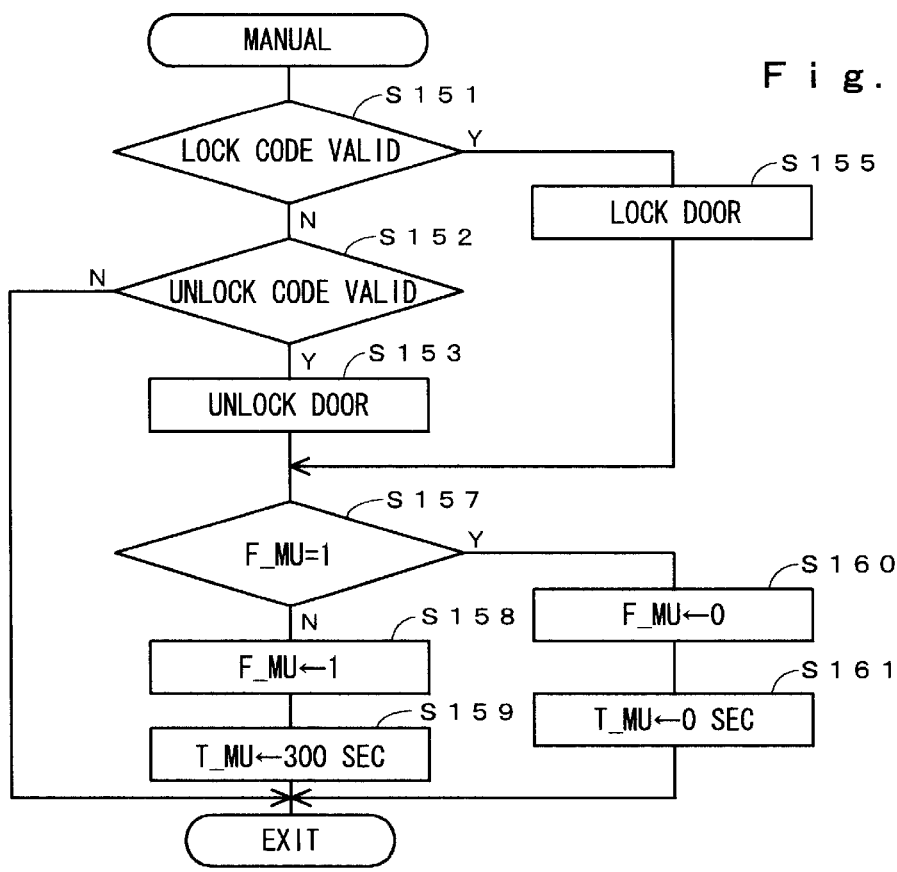
FIG. 17 is a flowchart showing a manual operation in the first embodiment of the present invention.

When the judgment is affirmative, the procedure advances to Step S16 for executing the manual operation process which will be described in detail referring to FIG. 17. The received code is not assumed now to be the manual code and it is thus judged "NO" at Step S15. The procedure then moves to Step S15F where it is judged whether the received code is the function control code or not. When it is judged negatively, the same examination as those of Steps S9A and S9B is executed at following Steps S15B and S15C. If they are negative in these Steps, the procedure then moves to Step S17 where it is examined whether the manual SW is turned on or not. When so, the procedure returns back to Step S2. But it is now judged "NO" and the procedure goes to Step S18 for initiating the welcome process shown in FIG. 9.

In the welcome process, "YES" at Step S171 and "NO" at Step S174 are provided and the procedure jumps to Step S180. As "NO" is also given at Step S180, it is examined at Step S188 whether the BLTM flag is 1 or not. At the time, the BLTM flag is not 1 and procedure moves to Step S189 where the BLTM flag is shifted to 1 to select the transmission of the BL response demand signal. Then at Step S190, the variable n is set to 1. While only the A code is received from the entry key, the above steps are repeated (excepting that because "YES" is given at Step S188, Steps S189 and S190 are skipped). The A response demand signal and the BL response demand signal are thus transmitted at their respective intervals of time.

As the driver steps closer to the vehicle, the entry key is enabled to receive the BL response demand signal from the vehicle and send back the B code. When the B code is received by the vehicle, it is judged "NO" at Steps S171 and S203 but "YES" at Step S201. Accordingly, the door is unlocked at Step S204. As the A code has been received at that time, "YES" is given at Step S209 and the transmission of the I response demand signal is inhibited at Step S212. At next Step S214, the BCHG flag is shifted to 0 to inhibit the switching of the response demand signal from the BL to the BS.

Figure 4:
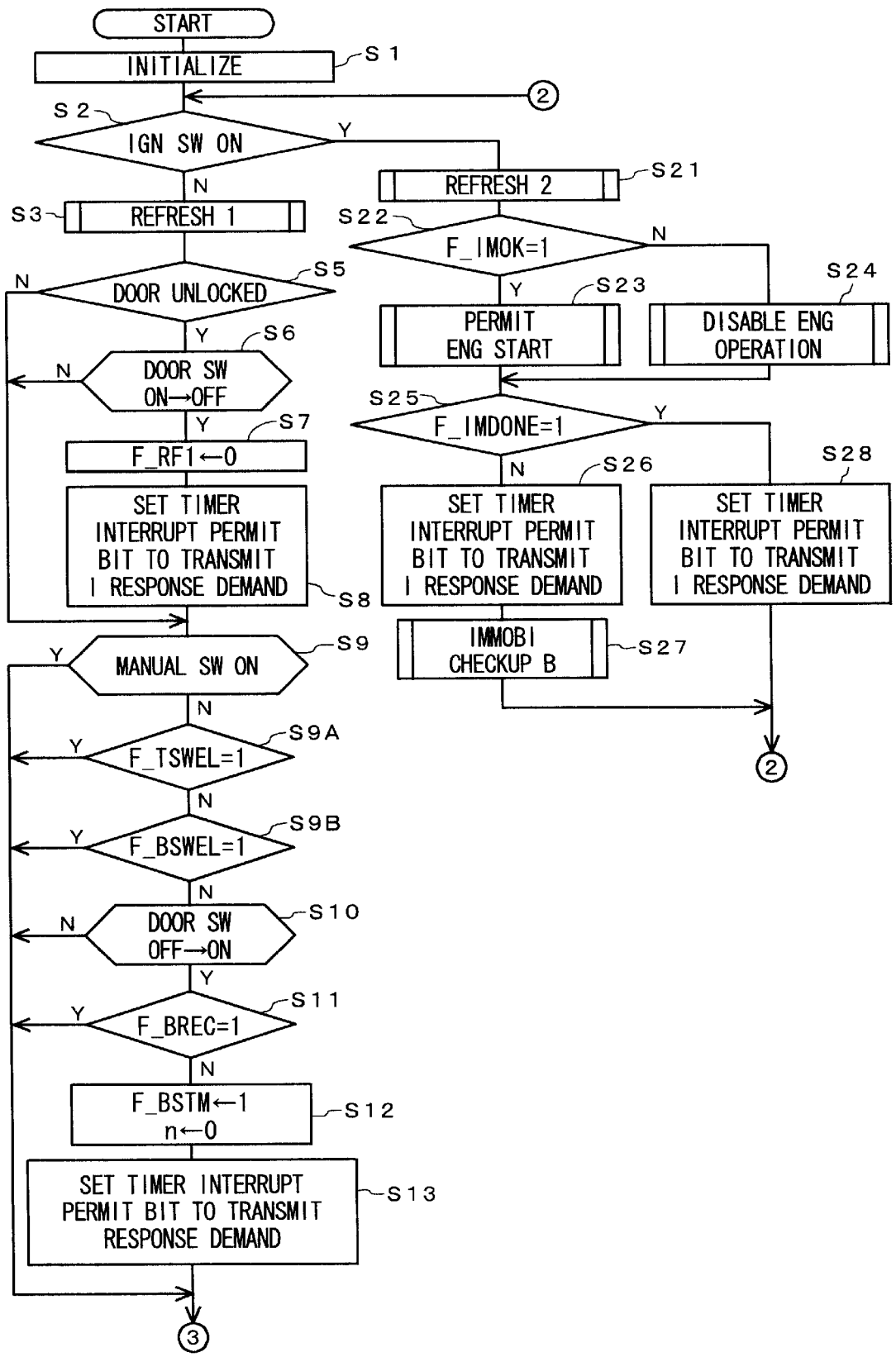
FIG. 4 is a part of the main flowchart showing an action of the first embodiment of the present invention.

As the driver opens the door, steps in the vehicle, and closes the door, it is judged "YES" at Step S6 (FIG. 4). Then, the timer interruption permitting bit for permitting the transmission of the I response demand signal is enabled at Step S8 to permit the timer interrupted intermittent transmission of the I response demand signal. At the time, the entry key is disabled to receive the A and B response demand signals (which are transmitted to only the outside of the vehicle) and hence, none of the A code and the B code are received by the vehicle.

The entry key 50 receives the I response demand signal and responds to send back the I code. When the I code is received by the vehicle, the procedure runs through Steps S14, S15, S15F, S15B, S15C and S17 and enters, at Step S18, the welcome process shown in FIG. 9. As it is judged "NO" at both Steps S171 and 201, the procedure advances to Step S221 shown in FIG. 10. A block denoted by the chained line SC in FIG. 10 is a known immobilizing process.

It is examined at Step S221 whether the IMDONE flag indicating the completion of the immobilizing checkup is 1 or not. At the time, the immobilizing checkup is not executed and the procedure goes to Step S222 for executing the immobilizing checkup. In the immobilizing checkup, the I code received is examined whether it is valid or not as will be explained later referring to FIG. 11. When so, the IMOK flag is turned to 1. Step S223 follows where the immobilizing checkup result is examined based on the IMOK flag whether or not it is all right.

When it is judged "NO" at Step S223, the operation of the engine is disabled at Step S227. When it is "YES", the procedure goes to Step S224 for permitting the start of the engine. At Step S225, the ATM flag is shifted to 0 and at Step S226, the AREC flag is shifted to 0. It may be possible at the time to reset the BLTM flag to 0 for stopping the transmission of the response demand signals. In the next cycle of receiving the I code, it is judged "YES" at Step S221. The procedure then moves to Step S228 where the timer interruption permitting bit for the I response demand signal is cleared off to prohibit the intermittent transmission of the I response demand signal.

The bit information of the IMOK flag is transferred via the communication line (bus) 32 to the FI-ECU 33 (See FIG. 1). In response to the bit of the IMOK flag, the FI-ECU 33 controls the action of a fuel pump, a fuel injector, a fuel feeder, and an ignition device (each not shown) in any known manner so that when the bit is 1, the engine is enabled and while when 0, the engine is disabled.

Figure 9:
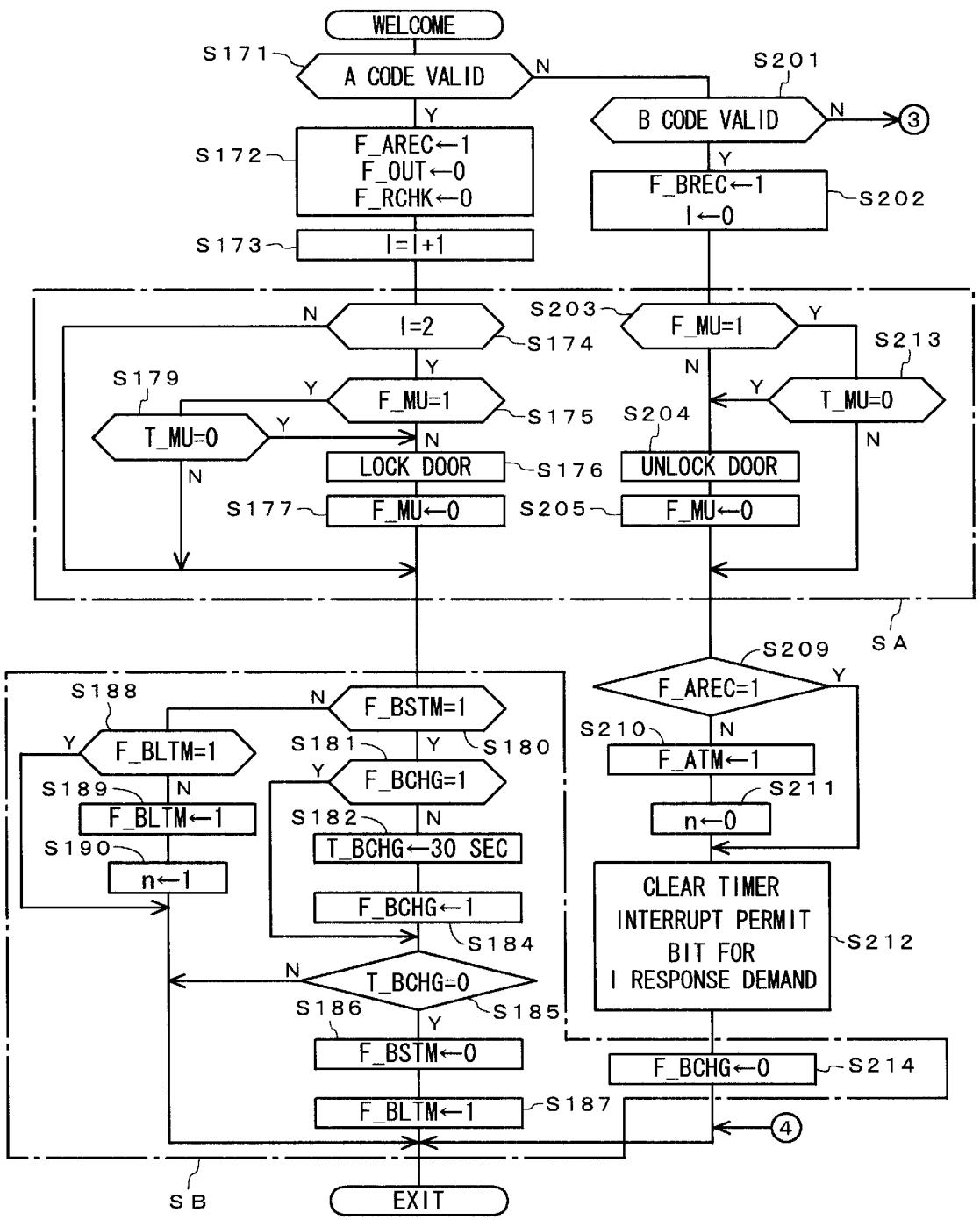
FIG. 9 is a flowchart showing a part of a welcome process in FIG. 6.
Figure 10:
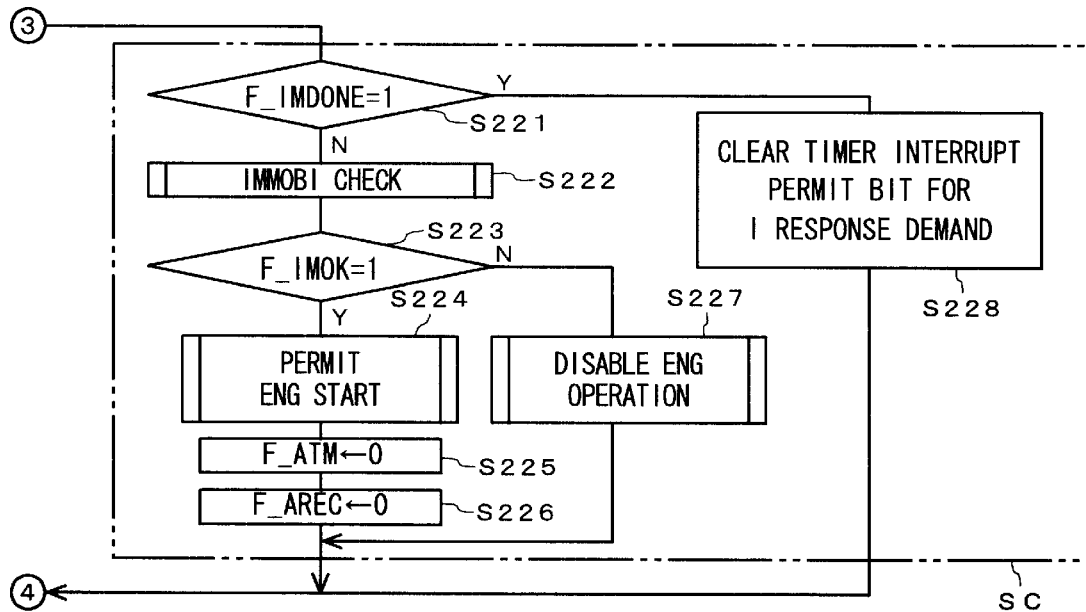
FIG. 10 is a flowchart showing the remaining part of the welcome process in FIG. 6.

The blocks enclosed with the chain line SB in FIG. 9 are provided for assigning different levels of hysteresis to the communication area for the B response demand signals at the embarkation and the disembarkation, and selecting the BS response demand signal when the driver gets away from the vehicle for permitting the door locking at earlier timing and while the BL response demand signal when the driver approaches towards the vehicle for permitting the door unlocking at possibly earlier timing.

It is, however, not mandatory to have the hysteresis. The BL and BS response demand signals shown in the timing charts of FIGS. 2 and 3 and in the schematic view of FIG. 13 may be combined to a single B response demand signal. It would clearly be understood in such a case that the process block for switching between the BS response demand signal and the BL response demand signal is eliminated. The steps enclosed with the chain line SA in FIG. 9 represent a procedure of stopping the execution of the process for responding with priority to the manual code after a predetermined time.

Figure 8:
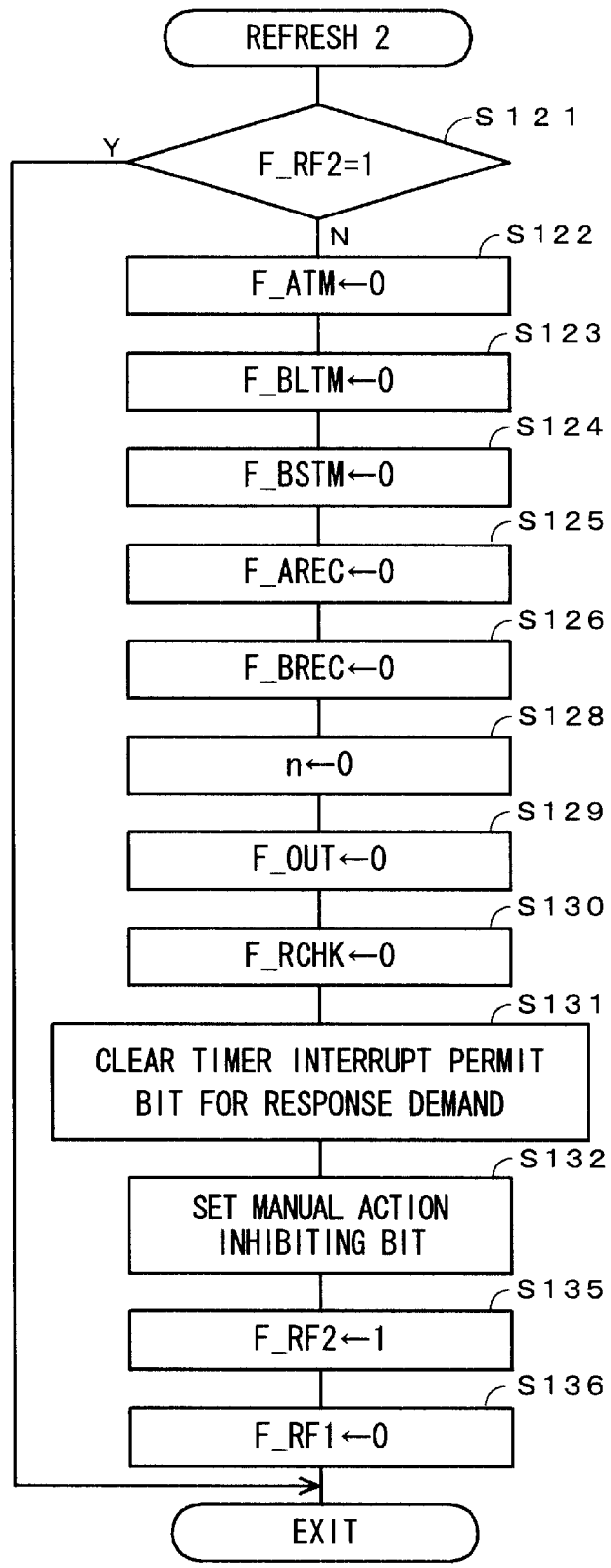
FIG. 8 is a flowchart showing a refresh 2 process in FIG. 4.

When the driver embarks and the IGN SW is turned on, it is judged "YES" at Step S2 in FIG. 4 and the procedure moves to Step S21 where are fresh 2 process for initializing the welcome function flags is executed as will be explained lately in more detail referring to FIG. 8. It is then examined at Step S22 whether the IMOK flag is 1 or not (i.e. the result of the immobilizing checkup is all right or not).

By now, the checkup is right and the procedure advances to Step S23 for enabling the start of the engine. It is then examined at Step S25 whether the IMDONE flag is 1 or not (i.e. the immobilizing checkup is finished or not). As the IMDONE flag is set to 1 in the immobilizing checkup process mentioned above, "YES" is given at Step S25. The procedure then goes to Step S28 where the timer interruption permitting bit for the I response demand signal is cleared off to prohibit the transmission of the I response demand signal. During the running of the vehicle, the IGN SW remains turned on, the above steps are repeated.

Figure 11:
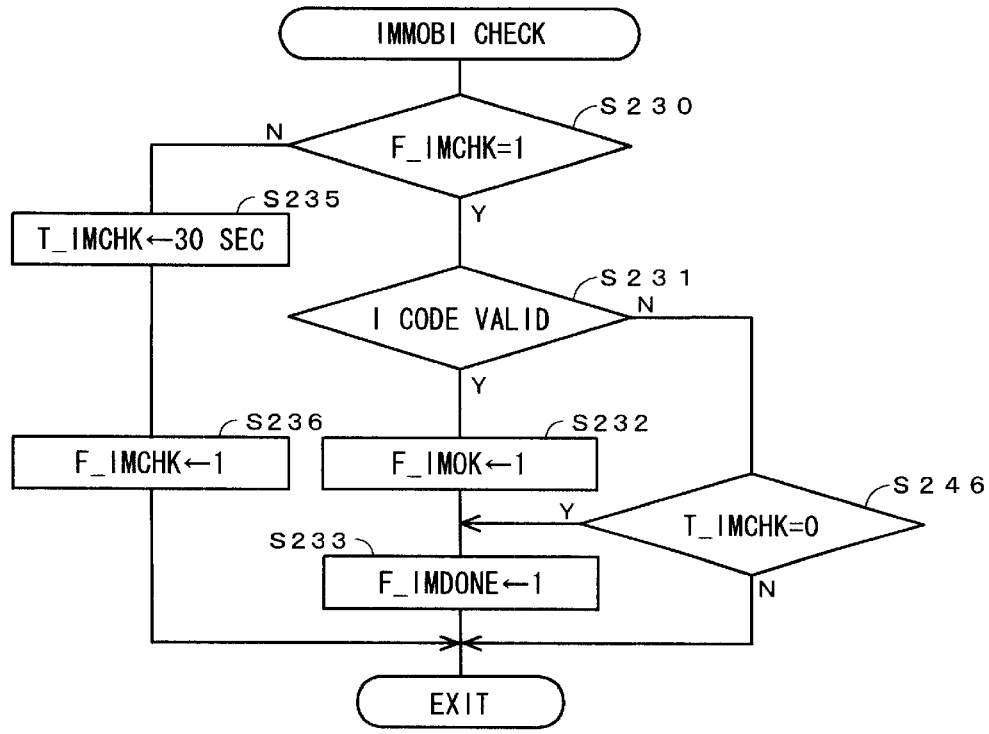
FIG. 11 is a flowchart showing an immobilizing checking process in the first embodiment of the present invention.

When judged "NO" at Step S25, the procedure moves to Step S26 where the timer interruption permitting bit for permitting the transmission of the I response demand signal is set to 1 similar to at Step S8. Then, the immobilizing checkup process, which will be explained later in conjunction with FIG. 11, is executed at Step S27.

When the IGN SW is turned to the ACC or OFF position to stop the engine, it is judged "NO" at Step S2. The procedure then moves to Step S3 for executing the above described process at the disembarkation.

An operation of function control (at Step S15D in FIG. 6) executed in response to the function control code transmitted by operating the switch 58 on the entry key 50, as a major feature of the present invention, will now be explained referring to the flowchart in FIG. 19. The function control involves disabling and enabling the transmission of the response demand signal from the transmitter equipped on the vehicle to stop and to resume (or make valid) the welcome function.

Figure 6:
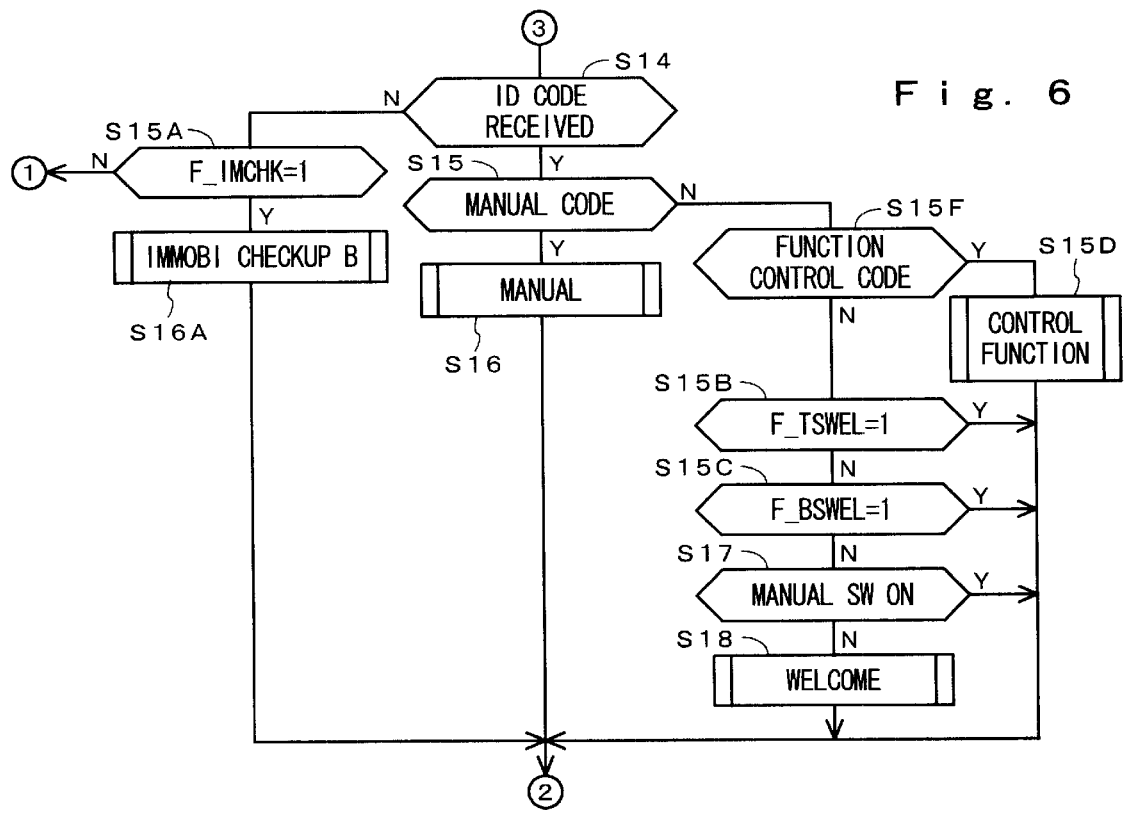
FIG. 6 is the remaining part of the main flowchart showing the action of the first embodiment of the present invention.
Figure 19:
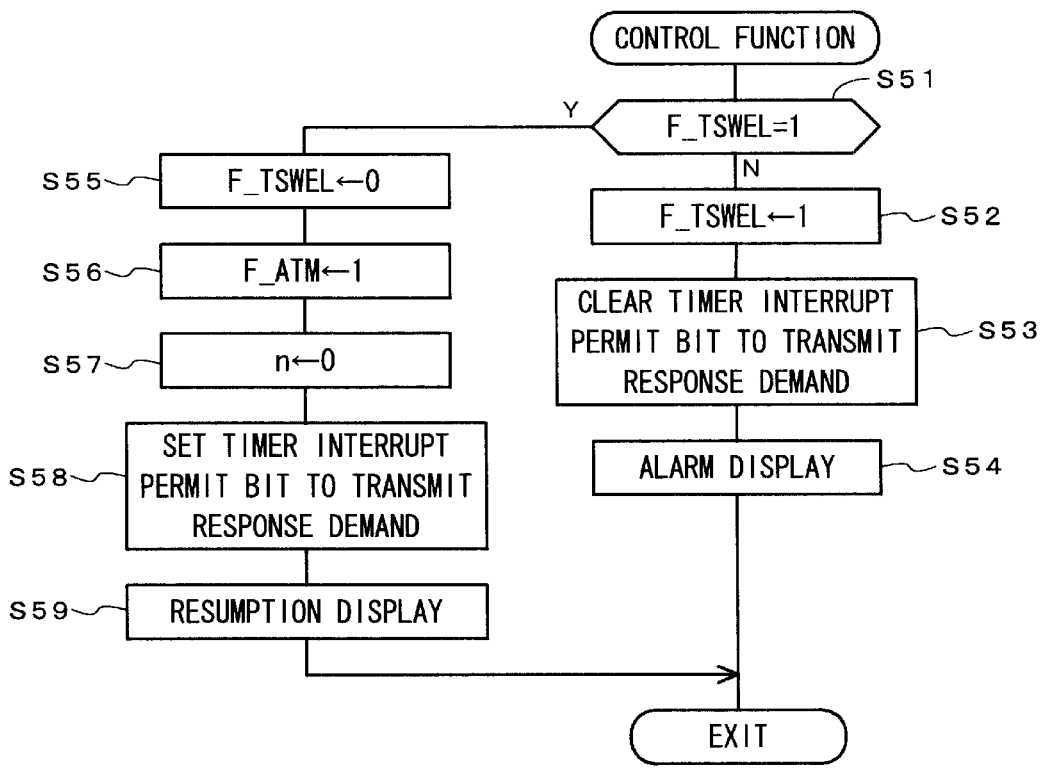
FIG. 19 is a flowchart showing a procedure of controlling the functions in response to a function disabling signal as a principal operation of the present invention.

When it is judged at Step S15F shown in FIG. 6 that the signal received from the entry key includes the function control code for stopping/restarting the welcome function, the procedure of a flowchart for the function control shown in FIG. 19 is executed at Step S15D. The procedure start with Step S51 which examines whether or not the TSWEL flag is 1, i.e. the welcome function has been stopped by the action of the switch on the entry key.

When the function control code is first received, the decision is negative and the procedure goes to Step S52 where the TSWEL flag is turned to 1. Then, Step S53 follows for clearing the response demand signal timer interruption permitting bit for transmission of the response demand signal and stopping the transmission of all response demand signals from the vehicle transmitter. At Step S54, the stopping of the welcome function is displayed (for example, with emission of a horn sound) and the procedure is terminated.

When it is judged at Step S51 that the flag is 1 indicating the stoppage of the welcome function, since it means the second reception of the function control code which demands resumption of the welcome function (or the transmission of the response demand signal), Steps S55 through S57 follow for turning the TSWEL flag to 0, the ATM flag to 1 for indicating that the transmission of the A response demand signal is selected, and the variable n to 0. This is followed by Step S58 where the response demand signal timer interruption permitting bit is shifted to 1 to enable the intermittent transmission of the response demand signal from the vehicle transmitter. Then, the resumption of the welcome function is displayed (for example, with emitting a horn sound) at Step S59 and the procedure is terminated.

A procedure of stopping the transmission of the response demand signal when the manual SW 7a in the entry key unit 1 is turned on will be described. When so, the decision at Steps S9 and S30 in the flowchart of FIGS. 4 and 5 is positive. Hence, the response demand signal timer interruption permitting bit is not set and the transmission of the response demand signal is stopped. The procedure then repeatedly moves from Step S2 to Steps S9, S12, S14, S15A, and S30 and returns back to Step S2 in a loop.

This allows the transmission of the response demand signal to be stopped upon the user's request for decreasing the power consumption of the battery to as a low level as possible, when the normal operation of the welcome function at the embarkation or the start of the engine is threatened by exhaustion or shortage of the battery storage power due to a longer period of the parking, excessive power consumption of the battery for the welcome function, hence contributing to the minimum consumption of the battery power.

When the function stopping switch 58 is provided in the entry key 50, it allows the user not to return to the vehicle even if the user fails to switch on the manual SW 7a at the embarkation or desires to have the vehicle parked for a longer period of time after the embarkation. The transmission of the response demand signals can successfully be stopped by manually turning on the switch 58 at a remote position thus to minimize the power consumption of the battery.

The stop page of the welcome function may be performed by another procedure, for example, which inhibits the door lock control in response to the reception of the response signal while allowing the transmission of the response demand signal. However, in view of the minimization of the power consumption of the battery, the above-mentioned procedure of stopping the transmission of the response demand signal is advantageous.

Figure 20:
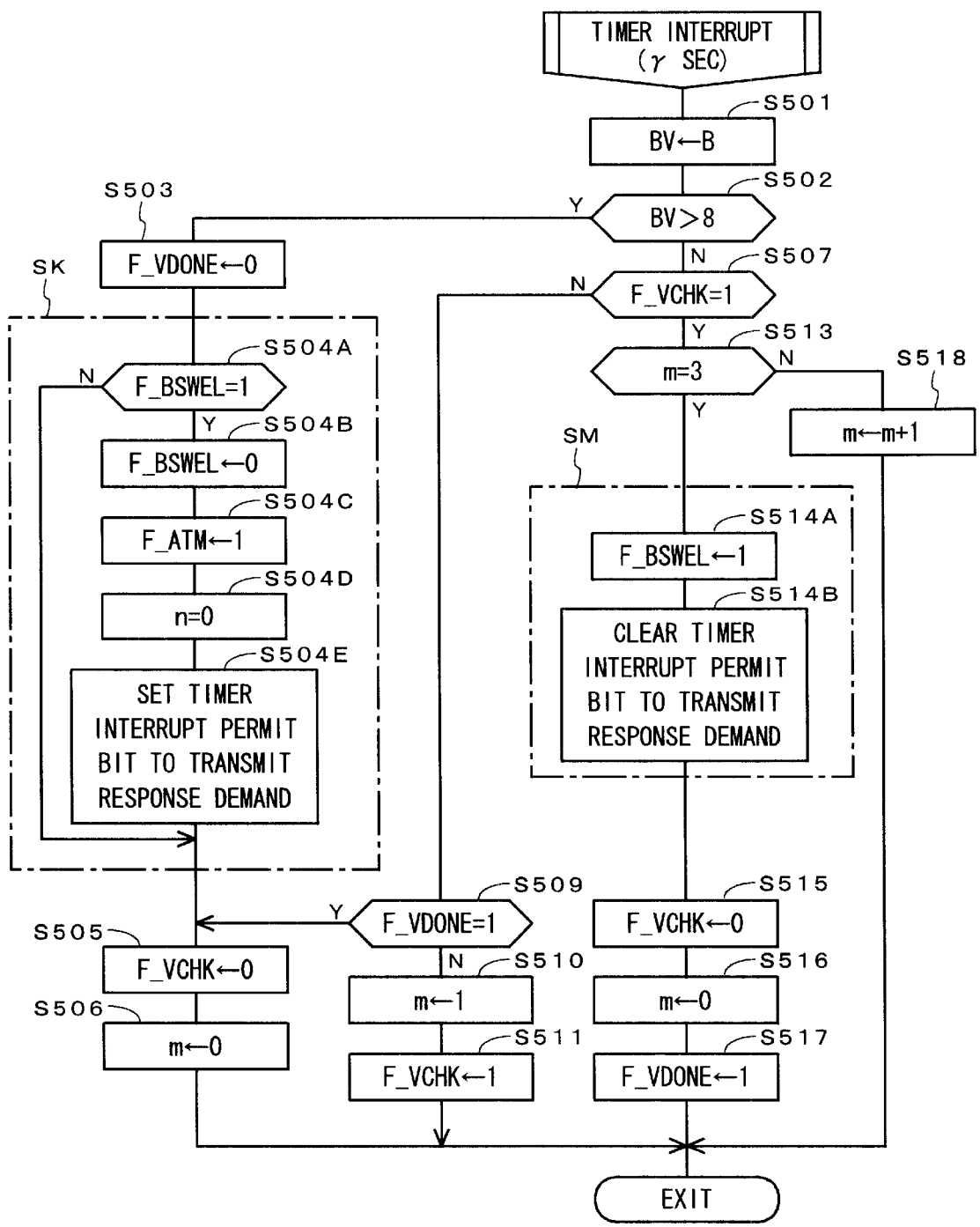
FIG. 20 is a flowchart showing a procedure of monitoring the battery which is carried out depending on the voltage level of a vehicle mounted battery as another principal operation of the present invention.

A procedure of carrying out other steps including stoppage of the welcome function in response to a drop in the terminal voltage of the vehicle mounted battery or battery monitoring steps as another major feature of the present invention will now be explained referring to FIGS. 20, 21A and 21B. This procedure is to automatically stop the transmission of the response demand signals to prevent excessive exhaustion of the battery power, for example, during a longer period of the parking which may result in disabling the door lock control in the form of the welcome function or declining the operating torque of a starter motor thus to start the engine with difficulty or in vain. A flowchart of FIG. 20 is executed with timer interruption at intervals of γ seconds.

Figure 21A:
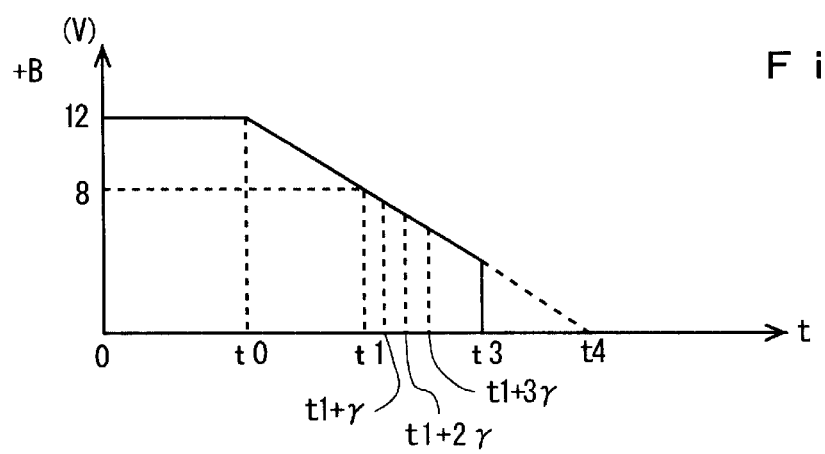
FIGS. 21A and 21B are time charts showing a variations of the terminal voltage of the vehicle mounted battery.
Figure 21B:
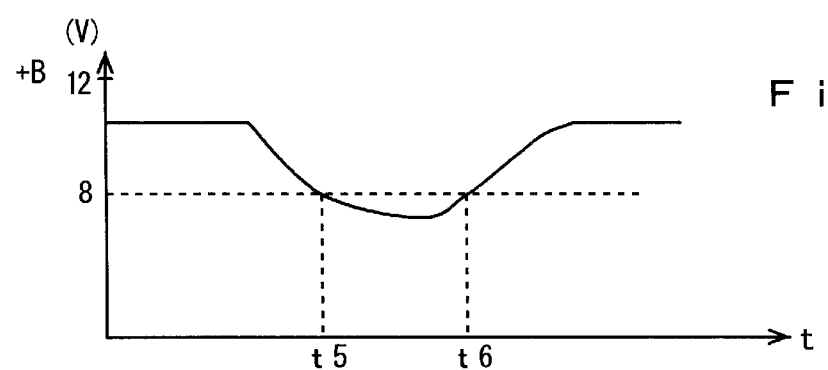

FIGS. 21A and 21B illustrate two profiles of declination of the terminal voltage of the vehicle mounted battery from its rated level (e.g. 12 V). In FIG. 21A, the battery voltage is maintained substantially at a constant level before the time t0 and then declined gradually to below a threshold (e.g. 8 V) at the time t1. Finally, the voltage is suddenly lowered to 0 V at the time t3 as the battery is removed for recharging or keeps discharging until it drops to 0 V at the time t4.

In FIG. 21B, when the terminal voltage of the battery has been declined to below its rated level, for example, the voltage temporarily drops to below the threshold level at t5 as the starter motor is driven at a very low temperature and then is returned back to the threshold level at t6 as the engine starts up.

In this embodiment, the threshold level is set to a voltage (8 V) higher than the level of the terminal voltage when the voltage drop is maximum under the normal operating condition of the battery, based on a reference voltage (for example, 6 V) which surely enables to drive the door lock motor for operating the door lock mechanism and/or to drive the starter motor for starting up the engine at a very low temperature condition. The threshold voltage may, however, be determined at any desired value, provided that the above mentioned purpose of the battery monitoring process can be achieved.

The procedure starts with Step S501 in FIG. 20 where the battery voltage BV is replaced with an actual (a present) level (+B). It is then examined at Step S502 whether or not the battery voltage BV is greater than the threshold level (8 V in this embodiment). When the battery voltage is normal, the decision is positive and the procedure goes to Step S503 for turning the VDONE flag, indicating the battery voltage has been inspected, to 0. It is then examined at Step S504A whether or not the BSWEL flag is 1 (i.e. the welcome function has been stopped due to a decrease in the battery voltage).

When the judgment of Step S504A is negative, the procedure jumps to Step S505. When the decision in this Step is positive, i.e. the battery voltage was declined to below the threshold level and the welcome function has been stopped, the procedure goes to Step S504B where the BSWEL flag is reset to 0 (because the voltage is returned back in a normal range). Then, the ATM flag is turned to 1 at Step S504C for permitting the vehicle transmitter to transmit the A response demand signal. Step S504D follows where the variable n is shifted to 0 (corresponding to time t6 in FIG. 21B).

This is followed by Step S504E where the response demand signal timer interruption permitting bit is shifted to 1 for allowing the intermittent transmission of the response demand signal to be transmitted from the vehicle transmitter. Then, the VCHK flag (indicating the start of checking the battery voltage) is turned to 0 at Step S505 and then, the parameter m indicating the number of checkups for the battery voltage is reset to 0 at Step S506 before the procedure is terminated. In other words, when the battery voltage stays in a normal range, for example, from t0 to t1 as shown in FIG. 21A, a routine from S503 to S506 is repeated at equal intervals of γ seconds. Accordingly, as the transmission of the response demand signal is not stopped, the welcome function remains enabled.

Then, after time of t1, the battery voltage drops down to below the threshold level (8 V) and the decision at Step S502 is negative. Step S507 follows where it is examined whether the VCHK flag is 1 or not. At the initial stage, the decision is negative and the procedure goes to Step S509 for examining whether or not the VDONE flag is 1 (i.e. the battery voltage check is finished). The decision is also negative at the initial stage and Step S510 follows where the count m of a counter indicating the number of interruption actions is turned to 1. Then, the procedure moves to Step S511 for shifting the VCHK flag to 1 and registering the start of checking the battery voltage.

In the next interruption cycle at (t1+γ), Steps S502 is negative and Step S507 is positive. The procedure hence advances to Step S513 where it is examined whether m=3 is established or not. By now, m is 1 and Step S513 is judged negatively and the procedure goes to Step S518 where m is incremented by 1 to be equal to 2.

In the succeeding interruption cycle at (t1+2γ), the same operation as of the cycle just preceding time at (t1+γ) is repeated and m=3 is given at Step S518. At the time (t1+3γ), Step S513 judges positively and Step S514A follows. The BSWEL flag is turned to 1 at Step S514A for registering the stoppage of the welcome function. Then, at Step S514B, the response demand signal timer interruption permitting bit is cleared off and the transmission of all the response demand signals from the vehicle mounted transmitter is stopped.

This is followed by Step S515 for resetting the VCHK flag to 0. Step S516 follows where m is also reset to 0. At Step S517, the VDONE flag is turned to 1. Accordingly, when the battery voltage is gradually declined and drops to below the threshold level as shown in FIG. 21A, the transmission of the response demand signal is inhibited and the welcome function is stopped. After the BSWEL flag indicating the stoppage is shifted to 1, the procedure is terminated.

When the battery voltage temporarily drops down to below the threshold level as shown in FIG. 21B, Step S502 judges negatively at the timer interruption just after t5 when the voltage drops down to lower than the threshold and the procedure goes to Step S507 and further. When the battery voltage quickly returns back to over the threshold level before m=3 is given at Step S513, however, the decision at Step S502 becomes positive. Accordingly, the BSWEL flag is not turned to 1 and the stoppage of the welcome function is not initiated. Even if m=3 is given and the BSWEL flag is turned to 1 at Step S514A to stop the welcome function, the re-increase of the battery voltage to above the threshold level causes Step S502 to judge positively and the BSWEL flag is reset to 0 at Step S504B. Hence, the transmission of the response demand signal is enabled at Step S504E for resuming the welcome function.

As described above, when the battery voltage drops down to lower than the threshold level, the transmission of the response demand signal is inhibited and the welcome function is stopped to limit the consumption of the battery power. Accordingly, even if the vehicle is not in use for a long period of time or the power of the battery is declined, the welcome function can successfully be initiated and also the battery voltage can be maintained to a level enough to drive the starter motor for starting the engine at a very low temperature. This will permit the user of the entry key to pay no attention to the consumption or remaining power of the battery.

While the transmission of the response demand signal is inhibited and the welcome function is stopped, the apparatus of the present invention responds to the manual code transmitted from the entry key for carrying out its corresponding door lock/unlock control as the second major feature of the present invention. More specifically, when manual code transmitted from the entry key 50 with the manual lock/unlock switches 56 and 57 operated is received by the vehicle, the decision at Steps S14 and S15 (FIG. 6) turns to positive regardless of the state of the manual SW 7a or the switch 58 or the level of the battery voltage and the manual processing at Step S16 (FIGS. 6 and 17) is executed.

It is first examined at Step S151 whether or not the manual code received is a lock code released through manual operation of the manual lock switch 56 on the entry key 50. When it is negative, the procedure goes to Step S152 for examining whether or not the manual code is an unlock code released through manual operation of the manual unlock switch 57 on the entry key 50. When it is judged not, this routine is terminated and the procedure goes to the exit.

When Step S152 is positive, the procedure moves to Step S153 for unlocking the vehicle door(s). When the judgment at Step S151 is positive, the procedure goes to Step S155 for locking the vehicle door(s). It is then examined at Step S157 whether or not the MU flag is 1 (i.e. the process responding to the manual code is being carried out with priority). When it is not, the MU flag is turned to 1 at Step S158.

This is followed by Step S159 where the manual timer for monitoring the duration of the manual code priority process is set to, for example, 300 seconds and the procedure is terminated to go to the exit. When Step S157 is positive, the procedure goes to Step S160 for resetting the MU flag to 0 and then Step S161 for resetting the MU timer to 0 seconds. Accordingly, when a new manual code (of either lock or unlock code) is received during the previous manual code prior process, the previous priority process is instantly discontinued.

As understood from the above description and the flowcharts of FIGS. 4 to 6, the reception of the manual code at Step S15 triggers the door lock/unlock control according to the manual code received by the vehicle even if the manual SW 7a is turned on or the welcome function is stopped by execution of the procedure of the function control (FIG. 19). In other words, when the welcome function is not operative due to a longer period of the parking, or for avoiding the consumption of the battery power, the user can unlock the door(s) of the vehicle by operating the manual unlock switch 57 or by operating switch 58 on the entry key to resume the welcome function as the user is coming close to the vehicle. As a result, while the welcome function is utilized, the consumption of the battery can be minimized.

Figure 18:
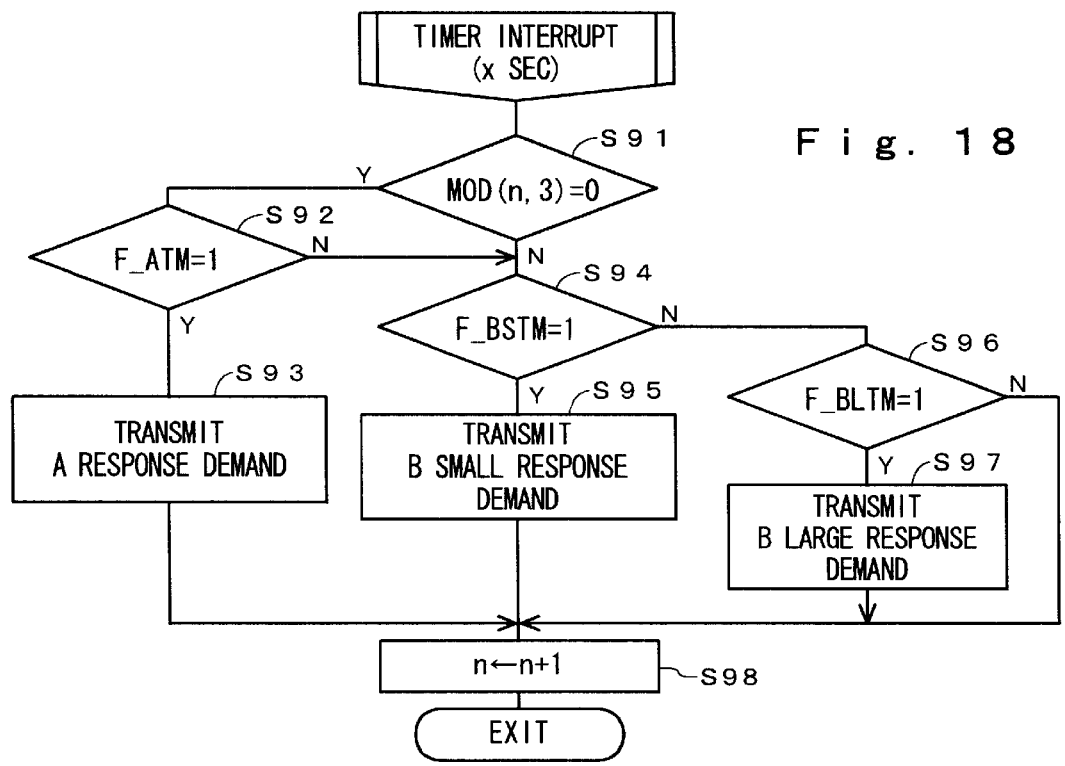
FIG. 18 is a flowchart showing the transmission of a response demand signal with timer interruption in the first embodiment of the present invention.

The transmission of the response demand signals in the welcome process will be explained referring to FIG. 18. This process is executed in every x seconds by the timer interruption to intermittently transmit the A or B (BL or BS) response demand signal, provided that the response demand signal transmission selecting flag is 1. The A, BL, and BS response demand signals may be selected as previously described referring to FIGS. 2, 3, and 13.

The procedure starts with Step S91 for examining whether MOD(n,3) is zero or not. MOD(n,3) is the remainder of the variable n divided by 3, which n is described previously concerning with Steps S190 and S211. When MOD(n,3) is zero, the procedure goes to Step S92 where it is examined whether the ATM flag is 1 or not. When so, the procedure goes to Step S93 for permitting the transmission of the A response demand signal.

When the remainder of n/3 is 1 or 2, it is judged "NO" at Steps S91 or S92 and the procedure moves to Step S94 where the BTSM flag is examined whether it is 1 or not. When so, the procedure goes to Step S95 for permitting the transmission of the BS response demand signal. When judged "NO" at Step S94, the procedure moves to Steps S96 for examining whether the BLTM flag is 1 or not. When so, the procedure advances to Step S97 for permitting the transmission of the BL response demand signal.

Figure 7:
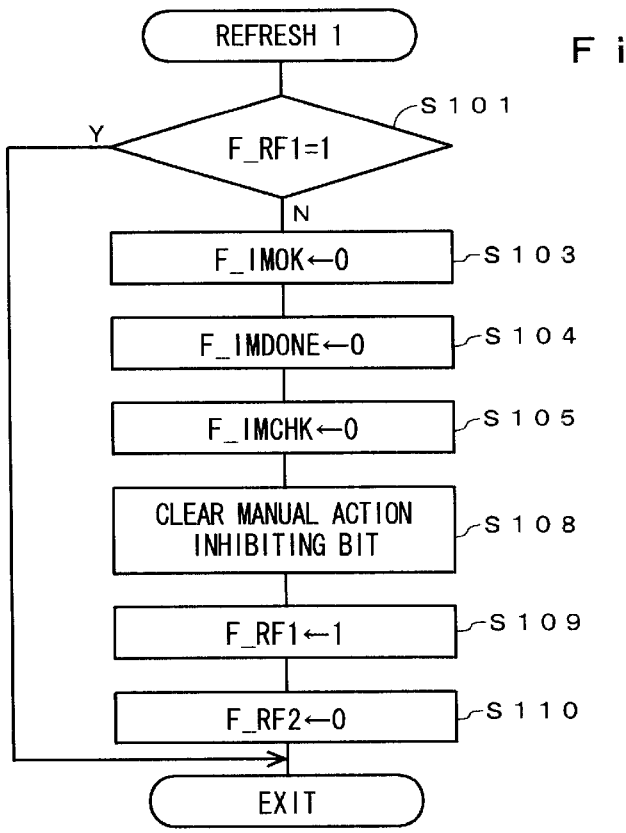
FIG. 7 is a flowchart showing a refresh 1 process in FIG. 4.

The refresh 1 process at Step S3 (FIG. 4) will now be explained referring to FIG. 7. At Step S101, the RF1 (refresh 1) flag is examined whether or not it is 1 as indicating that the refresh process is completed. When judges "YES", i.e. the refresh 1 process is completed, the procedure jumps to EXIT. In the beginning, it is judged "NO". At next Step S103, the IMOK flag is shifted to 0 and at Step S104, the IMDONE flag (immobilizing checkup is done) is shifted to 0. At Step S105, the IMCHK flag (immobilizing checkup is started) is reset to 0. At Step S108, the manual operation inhibit bit is cleared.

As the result, the initialization of the immobilizing checkup flags is completed. At Step S109, the RF1 flag is turned to 1 to register that the refresh 1 process has been done. At Step S110, the RF2 flag is turned to 0 to register that the refresh 2 process is not yet done.

The refresh 2 process at Step S21 (FIG. 4) will be explained in more detail referring to FIG. 8. At Step S121, the RF2 flag is examined whether it is 1 or not, i.e. the refresh 2 process has been done or not. When "YES", the procedure jumps to EXIT. When judged "NO", the procedure runs through Steps S122, S123, and S124 for resetting the ATM, BLTM, and BSTM flags to 0, respectively. Those steps are to inhibit the transmission of the A, BL, and BS response demand signals, respectively.

This is followed by Steps S125 and S126 for resetting the AREC and BREC flags to 0, respectively. These two steps are provided for registering that the code A or B, which is included in a response signal send back from the entry key 50 in response to the reception of the demand signal transmitted from the vehicle, is not yet received by the receiver on the vehicle. At Step S128, the variable n for determining the response demand signal to be transmitted is turned to zero.

At Step S129, the OUT flag is shifted to 0 (denied) for indicating that the entry key 50 is out of the communication area of the A response demand signal. At Step S130, the RCHK flag is set to 0 to indicate that the T-OUT timer is not started which sets the limited time for detecting whether or not the entry key 50 is out of the communication area for the A response demand signal. At Step S131, the timer interruption permitting bit for the response demand signal is cleared off to inhibit the timer interrupted transmission. At Step S132, the manual operation inhibit bit is set.

After the above steps, the initialization of the welcome function flags are completed. Then, Step S135 follows where the RF2 flag is turned to 1 to register the completion of the refresh 2 process. At Step S136, the RF1 flag is reset to 0 for registering the non-completion of the refresh 1 process.

The immobilizing checkup process at Step S222 (FIG. 10) will be explained in more detail referring to FIG. 11. The immobilizing checkup process starts with Step S230 for examining whether the IMCHK flag for indicating the starting of the immobilizing checkup process is 1 or not. When the immobilizing checkup process is not started and "NO" is given, the procedure moves to Step S235 for setting the immobilizing checkup timer T-IMCHK to a desired immobilizing checkup period (for example, 30 seconds) At Step S236, the IMCHK flag is shifted to 1.

When the immobilizing checkup process has been started and it is judged "YES" at Step S230, the procedure advances to Step S231 for examining whether or not the immobilizing code I sent back from the entry key is identical to the code previously saved in a memory 5 or 13 on the vehicle. When so, the procedure goes to Step S232 where the IMOK flag is turned to 1 to indicate the confirmation of the immobilizing code comparison and Step S233 follows. Those steps allow the FI-ECU 33 to positively control the operation of the engine as described previously.

When judged "NO" at Step S231, the procedure goes to Step S246 for examining whether the IMCHK timer is timed up or not. When not, the immobilizing checkup process is terminated. When judged "YES" at Step S246, the procedure goes to Step S233. At Step S233, the IMDONE flag indicating that the immobilizing checkup process has been done is turned to 1.

Figure 12:
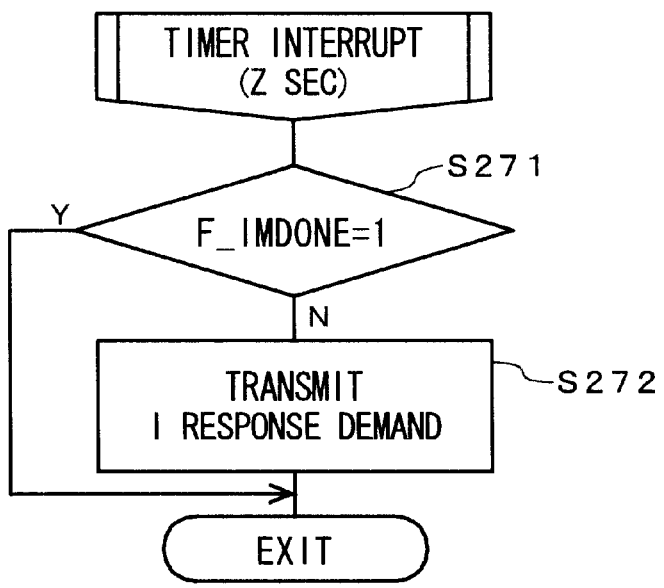
FIG. 12 is a flowchart showing the transmission of an I response demand signal with timer interruption in the first embodiment of the present invention.

FIG. 12 illustrates the intermittent transmission of the I response demand signal with the timer interruption permitting bit for the I response demand signal being enabled, where the timer interruption may be carried out in every z seconds. The procedure starts with Step S271 for examining based on the IMDONE flag whether the immobilizing checkup process is done or not. If not, the procedure goes to Step S272 for permitting the transmission of the I response demand signal. When the immobilizing checkup process has been done and it is judged "YES" at Step S271, the procedure is terminated to go to the exit.

In the previously mentioned embodiment, in addition to the BS and BL response demand signals for directly controlling the locking/unlocking of the vehicle door, the A response demand signal which covers a wider communication area than that of the BS and BL signals are transmitted from the vehicle. It should be, however, understood by those skilled in the art that the A response demand signal is not mandatory but may be omitted if desired.

The foregoing embodiment is based on the use of the B response demand signals common to all the doors of a vehicle in conjunction with their response signals. In that case, it may happen that when the entry key steps in such a predetermined communication area as denoted by the BL (large) in FIG. 13, all the doors are unlocked at same time.

Figure 14:
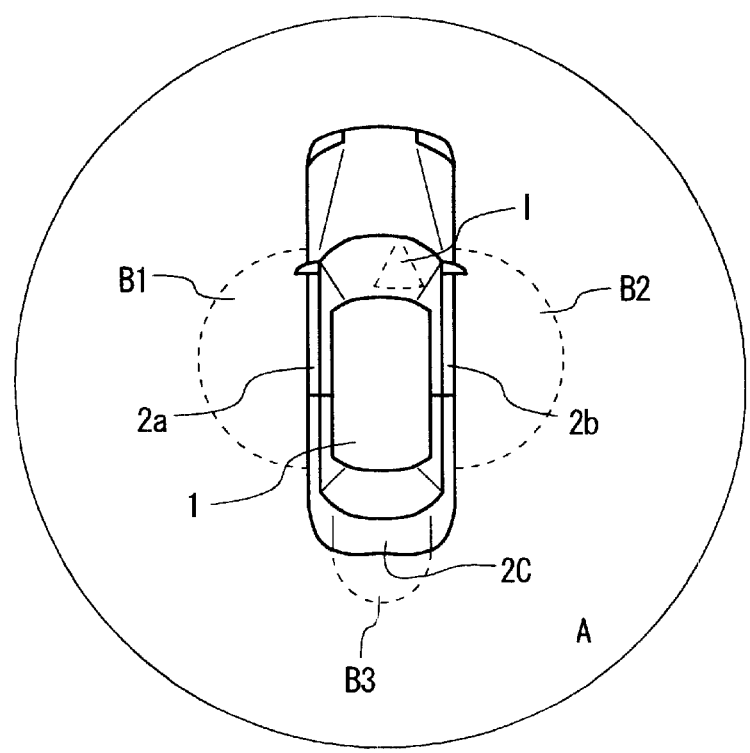
FIG. 14 is a schematic view showing the relation between the control operations and the distance from the vehicle to the entry key in another embodiment of the present invention.

For avoiding such a disadvantageous event, an alternative embodiment is provided as shown in the schematic view of FIG. 14 where three different B response demand signals B1, B2, and B3 which are uniquely assigned to and respectively have proper communication areas for two of left and right doors 2a, 2b and a rear trunk door 2c are provided. For example, when any one of the three B response demand signals is not received, all the doors are locked simultaneously. On the other hand, only a particular one of the doors can be unlocked by the controlling action of a vehicle mounted receiver which receives a B code for said particular door included in a response signal to the B response demand signal assigned to said particular door.

Itis appreciated in case of FIG. 14 that the B response demand signals may be provided with such hysteresis characteristics between the unlock and lock operation as mentioned above, and/or the A respond demand signals with the widest communication areas may be omitted.

It should be also understood by those skilled in the art that for applying the B response demand signals assigned to their respective doors, Step S201 in the flowchart of the welcome process shown in FIG. 9 may be modified to examine the received code for its matching with an unique code assigned to each door. Hence, the modification of the flowchart will be explained in no more detail.

Figure 15:
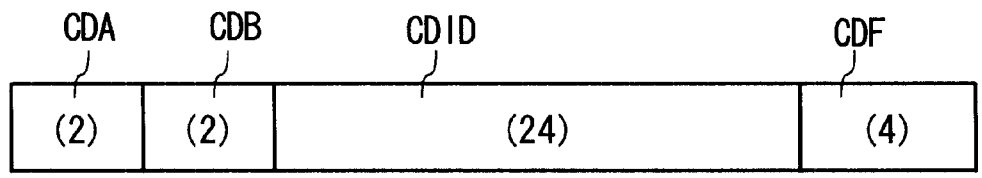
FIG. 15 is a diagram showing an exemplary format of the response demand signals preferably applicable to the present invention.

FIG. 15 illustrates an exemplary format of the response signal applicable to the above- and under-mentioned embodiments of the present invention. The "code signal" used herein is a general term including the response signals sent back upon receiving the response demand signal and both of the manual codes and function control codes released through operation of the manual switches on the entry key. In the figure, CDA is a start bit, CDB is an identification code, CDID is a unique ID code of the vehicle, and CDF is a function code while the number in each parenthesis represents an exemplary number of bits.

Basically, the ID code is used to judge whether the entry key is authentic or not and the function code is used to identify the A code (a search code) and the B code (a door lock control basic code) from each other. The function code may be comprised of four bits, respectively; for example, the A code is [1000], the B code [1001], the manual lock code [1101], and the manual unlock code [1100], respectively in the case of FIG. 13, while the A code is [1000], the B code for the driver's door [1001], the B code for the passenger's door [1010], the B code for the trunk door [1011], the manual lock code [1101], and the manual unlock code [1100], and the function control code [1110], respectively in the case of FIG. 14.

Figure 16:
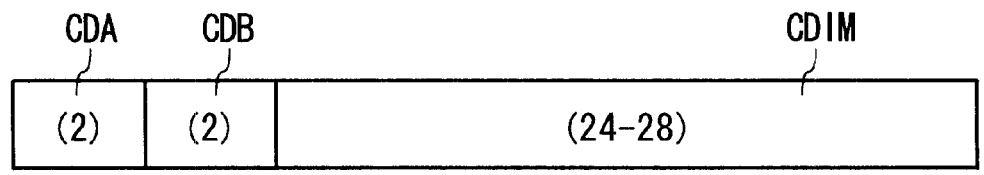
FIG. 16 is a diagram showing an exemplary format of the response signal for immobilizing operation preferably applicable to the present invention.

FIG. 16 illustrates an exemplary format of the response signal for the (anti-thief) immobilizing function applicable to the embodiments of the present invention. As the code comparison for the immobilizing function is extremely important for ensuring the anti-thief action as well known, it may preferably be differentiated in the structure from the other codes. As shown, CDA is a start bit, CDB is an identification code, and CDIM is an immobilizing function ID code. It is also possible to have all types of the response signals designed to a single particularly structured format, and to distinguish ID code on the basis of the function codes as other A and B codes.

As set forth above, according to the present invention, both locking and unlocking the vehicle door(s) are automatically controlled depending on the reception of the response signal at the receiver in the vehicle. But the present invention is not limited to such embodiments and any modification where either the locking or unlocking is automatically controlled may be made.

According to the present invention, when the power of the battery on a vehicle is significantly declined due to, for example, a longer period of the parking and thus it possibly fails to surely perform the door lock control or the welcome function for automatically locking and unlocking the door(s) of the vehicle in response to the reception of a response signal which is sent back from the entry key corresponding to the response demand signal from the vehicle and/or it may cause the operating toque of a starter motor to be lowered to start the engine with difficulty or in vain, the driver or the user of the entry key optionally stops the welcome function to minimize the power consumption of the battery during the parking.

In case that such decrease of the battery power may provide a lower output voltage to disable the control operations of the vehicle (particularly, the start up of the engine), the welcome function can automatically be stopped to save the battery power and sustain the minimum level of the control operations for the vehicle. Also, when the function control code transmitting means for directing the stopping and resuming the control functions is equipped in the portable transmitter/receiver or the entry key, even if the welcome function fails to be turned off by the user at the disembarkation or is desired to be turned off since the period of parking is to be extended, it can automatically be stopped thus permitting the user to be free from returning back to the vehicle to stop the welcome function and contributing to the improvement of the utility.

What is claimed is:

1. A remote control system for a vehicle door comprising:
   a transmitter mounted on the vehicle for transmitting a response demand signal receivable within a predetermined range outside of the vehicle;
   a portable transmitter/receiver for transmitting a response signal in response to receiving the response demand signal;
   a vehicle mounted receiver for receiving the response signal transmitted from the portable transmitter/receiver; and
   a controlling means for determining whether or not the response signal received at said receiver is a valid one, and for controlling at least one of locking and unlocking of the door(s) of the vehicle in response to the valid response signal received,
   at the vehicle side, a voltage detecting means for detecting decrease of a voltage of a battery mounted on the vehicle to be lower than a predetermined level, which is higher than the level at which the activation of a door lock mechanism is assured, and for producing a voltage drop signal; and a function stopping means for stopping the transmission of the response demand signal in response to the voltage drop signal are provided;
   the portable transmitter/receiver is further provided with a manual switch for transmitting a manual control signal for controlling door lock, which is different from the response signal; and
   when the vehicle mounted receiver receives the manual control signal, the controlling means carries out at least one of locking and unlocking the vehicle door(s) corresponding to the manual control signal received even if the transmission of the response demand signal is stopped.

2. A remote control system for a vehicle door according to claim 1, wherein the voltage detecting means detects decrease of a voltage of the battery to be lower than a predetermined level continuously in a predetermined number of times by checking the battery at regular time intervals and produces the voltage drop signal.

3. A remote control system for a vehicle door comprising:
   a transmitter mounted on the vehicle for transmitting a response demand signal receivable within a predetermined range outside of the vehicle;
   a portable transmitter/receiver for transmitting a response signal in response to receiving the response demand signal;
   a vehicle mounted receiver for receiving the response signal transmitted from the portable transmitter/receiver; and
   a controlling means for determining whether or not the response signal received at the receiver is a valid one, and for controlling at least one of locking and unlocking of the door(s) of the vehicle in response to the valid response signal received,
   wherein the portable transmitter/receiver is provided with a function stoppage directing means for transmitting a function stoppage signal, which is different from the response signal, in the operation of the portable transmitter/receiver, and a function stoppage means for stopping the transmission of the response demand signal in response to the function stoppage signal.

4. A remote control system for a vehicle door according to claim 3, wherein the portable transmitter/receiver is further provided with a manual switch for transmitting a manual control signal for controlling door lock, which is different from the response signal; and when the vehicle mounted receiver receives the manual control signal transmitted from the portable transmitter/receiver for door lock control, the controlling means carries out at least one of locking and unlocking the vehicle door(s) corresponding to the manual control signal received even if the transmission of the response demand signal is stopped.

5. A remote control system for a vehicle door according to claim 3, wherein the function stoppage means releases a transmission stoppage condition of the response demand signal when it receives a function stoppage signal during the stoppage of the function.

6. A remote control system for a vehicle door according to claim 4, wherein the function stoppage means releases a transmission stoppage condition of the response demand signal when it receives a function stoppage signal during the stoppage of the function.

7. A remote control system for a vehicle door according to claim 1, wherein the function stopping means indicates that the transmission of the response demand signal is stopped or a transmission stoppage of the response demand signal is released.

8. A remote control system for a vehicle door according to claim 2, wherein the function stopping means indicates that the transmission of the response demand signal is stopped or a transmission stoppage of the response demand signal is released.

9. A remote control system for a vehicle door according to claim 3, wherein the function stoppage means indicates that the transmission of the response demand signal is stopped or the transmission stoppage of the response demand signal is released.

10. A remote control system for a vehicle door according to claim 4, wherein the function stoppage means indicates that the transmission of the response demand signal is stopped or the transmission stoppage of the response demand signal is released.

11. A remote control system for a vehicle door according to claim 5, wherein the function stoppage means indicates that the transmission of the response demand signal is stopped or the transmission stoppage of the response demand signal is released.

* * * * *